(12) United States Patent
Ichiki et al.

(10) Patent No.: US 9,301,104 B2
(45) Date of Patent: Mar. 29, 2016

(54) DATA OUTPUT METHOD, DATA OUTPUT PROGRAM, AND TERMINAL DEVICE

(71) Applicant: FUJITSU LIMITED, Kawasaki-shi, Kanagawa (JP)

(72) Inventors: Atsushi Ichiki, Kawasaki (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 13/762,866

(22) Filed: Feb. 8, 2013

(65) Prior Publication Data
US 2013/0250835 A1    Sep. 26, 2013

(30) Foreign Application Priority Data

Mar. 23, 2012 (JP) ................................. 2012-068228

(51) Int. Cl.
| | |
|---|---|
| *H04N 7/173* | (2011.01) |
| *H04W 4/06* | (2009.01) |
| *H04H 20/93* | (2008.01) |
| *H04N 21/41* | (2011.01) |
| *H04N 21/434* | (2011.01) |
| *H04N 21/435* | (2011.01) |

(Continued)

(52) U.S. Cl.
CPC ............... *H04W 4/06* (2013.01); *H04H 20/93* (2013.01); *H04H 60/375* (2013.01); *H04H 60/80* (2013.01); *H04N 21/4126* (2013.01); *H04N 21/435* (2013.01); *H04N 21/436* (2013.01); *H04N 21/4345* (2013.01); *H04N 21/44204* (2013.01); *H04N 21/4722* (2013.01); *H04N 21/812* (2013.01)

(58) Field of Classification Search
CPC .. H04W 4/06; H04N 21/4126; H04N 21/435; H04N 21/44204; H04N 21/812; H04N 21/436

USPC ........................................................ 370/312
See application file for complete search history.

(56) References Cited

U.S. PATENT DOCUMENTS 7,536,151 B2 * 5/2009 Forsberg ..................... 455/41.2
2002/0081974 A1 6/2002 Eaton et al.
(Continued)

FOREIGN PATENT DOCUMENTS

| CN | 1449606 | 10/2003 |
|---|---|---|
| CN | 101627402 | 1/2010 |

(Continued)

OTHER PUBLICATIONS

Extended European Search Report issued Jul. 4, 2013 in corresponding European Application No. 13155393.5.
(Continued)

*Primary Examiner* — Melvin Marcelo
(74) *Attorney, Agent, or Firm* — Staas & Halsey LLP

(57) ABSTRACT

A mobile terminal device receives CM-related-information stored information from a receiving device that has received, from a sending device, the CM-related-information stored information together with a main program and a program containing a CM. Then, The mobile terminal device receives CM related information that is related to a CM from the sending device on the basis of the CM-related-information stored information. Then, the mobile terminal device displays the CM related information using text, a still image, or a moving image on the display screen in areas below a Web browser display, which is a normal display.

15 Claims, 24 Drawing Sheets

(51) Int. Cl.

| | | |
|---|---|---|
| H04N 21/436 | (2011.01) | |
| H04N 21/442 | (2011.01) | |
| H04N 21/4722 | (2011.01) | |
| H04N 21/81 | (2011.01) | |
| H04H 60/37 | (2008.01) | |
| H04H 60/80 | (2008.01) | |

(56) References Cited

U.S. PATENT DOCUMENTS

| | | |
|---|---|---|
| 2005/0034163 A1 | 2/2005 | Nakagawa et al. |
| 2005/0177861 A1 | 8/2005 | Ma et al. |
| 2008/0051070 A1 | 2/2008 | Dharmaji |
| 2010/0251279 A1 | 9/2010 | Piard et al. |
| 2010/0262486 A1 | 10/2010 | Matsunaga et al. |

FOREIGN PATENT DOCUMENTS

| | | |
|---|---|---|
| CN | 102187683 | 9/2011 |
| EP | 1737242 A2 | 12/2006 |
| EP | 2339767 A1 | 6/2011 |
| EP | 2339847 A1 | 6/2011 |
| JP | 2001-266482 | 9/2001 |
| WO | WO 03/079690 A1 | 9/2003 |
| WO | WO2006/062105 | 6/2006 |

OTHER PUBLICATIONS

European Office Action dated Jun. 5, 2015 in corresponding European Patent Application No. 13155393.5.

Office Action, mailed Nov. 10, 2015, in corresponding Japanese Application No. 2012-068228 (7 pp.).

Office Action, dated Nov. 2, 2015, in corresponding Chinese Application No. 201310062396.8 (21 pp.).

* cited by examiner

FIG.2

| IP HEADER | TCP OR UDP HEADER | MESSAGE ID 0x0001 | DEVICE TYPE 0x1002 | RESPONSE DESTINATION IP ADDRESS 192.168.1.20 | RESPONSE DESTINATION PORT NUMBER 60000 |

FIG.3

| IP HEADER | TCP OR UDP HEADER | MESSAGE ID 0x0002 |

FIG.4

| IP HEADER | UDP HEADER | MESSAGE ID 0x0001 | DEVICE TYPE 0x1001 | RESPONSE DESTINATION IP ADDRESS 192.168.1.10 | RESPONSE DESTINATION PORT NUMBER 60000 |

FIG.5

| IP HEADER | TCP OR UDP HEADER | MESSAGE ID 0x0002 | COMMUNICATION IP ADDRESS 192.168.1.20 | COMMUNICATION IP PORT NUMBER 55000 |
|---|---|---|---|---|

FIG.6

| IP HEADER | TCP OR UDP HEADER | MESSAGE ID 0x0001 | DEVICE TYPE 0x1001 | CONNECTION DESTINATION IP ADDRESS 192.168.1.10 | CONNECTION DESTINATION PORT NUMBER 60000 |
|---|---|---|---|---|---|

FIG.7

| IP HEADER | TCP OR UDP HEADER | MESSAGE ID 0x0002 |
|---|---|---|

FIG.8

| IP HEADER | TCP OR UDP HEADER | MESSAGE ID 0x0001 | DEVICE TYPE 0x1002 | CONNECTION DESTINATION IP ADDRESS 192.168.1.20 | CONNECTION DESTINATION PORT NUMBER 55000 |
|---|---|---|---|---|---|

FIG.9A

| IP HEADER | TCP OR UDP HEADER | MESSAGE ID 0x0003 | CONNECTION DESTINATION IP ADDRESS 192.168.1.20 | CONNECTION DESTINATION PORT NUMBER 55000 |
|---|---|---|---|---|

FIG.9B

| IP HEADER | TCP OR UDP HEADER | MESSAGE ID 0x0003 | CONNECTION DESTINATION IP ADDRESS 192.168.1.10 | CONNECTION DESTINATION PORT NUMBER 60000 |
|---|---|---|---|---|

| DATA STRUCTURE | NUMBER OF BITS |
|---|---|
| CMDataServer_descriptor(){ | |
| descriptor_tag | 8 |
| descriptor_length | 8 |
| IP_Address | 32 |
| IP_Port | 16 |
| Channel_ID | 16 |
| Program_ID | 16 |
| } | |

FIG.12

| CM | BROADCAST LENGTH | TYPE |
|---|---|---|
| CM1 | 30 SECONDS | PROVIDED CM TO PROGRAM |
| CM2 | 15 SECONDS | PROVIDED CM TO PROGRAM |
| CM3 | 15 SECONDS | SPOT CM |

FIG.13

| CHANNEL ID | PROGRAM ID | CM ID | CM TYPE | CM RELATED INFORMATION TYPE | CM INSERTION TIME | | VALIDITY PERIOD | | DISPLAY ORDER | STORAGE LOCATION |
|---|---|---|---|---|---|---|---|---|---|---|
| 1 | 1 | 1 | 1 | 1 | 2012/2/29 | 8:30:00 TO 8:30:30 | 2012/2/29 | 9:00:00 | 1 | 1 |
| 1 | 1 | 1 | 1 | 2 | 2012/2/29 | 8:30:00 TO 8:30:30 | 2012/2/29 | 9:00:00 | | 2 |
| 1 | 1 | 2 | 1 | 1 | 2012/2/29 | 8:30:30 TO 8:30:45 | 2012/2/29 | 9:00:00 | 2 | 3 |
| 1 | 1 | 2 | 1 | 3 | 2012/2/29 | 8:30:30 TO 8:30:45 | 2012/2/29 | 9:00:00 | | 4 |
| 1 | 1 | 3 | 2 | 1 | 2012/2/29 | 8:30:45 TO 8:31:00 | 2012/2/29 | 9:00:00 | 3 | 5 |
| ... | ... | ... | ... | ... | ... | ... | ... | ... | ... | ... |
| 1 | 10 | 21 | 1 | 1 | 2012/2/29 | 17:15:00 TO 17:15:15 | 2012/2/29 | 18:00 | 1 | 1 |
| 1 | 10 | 22 | 2 | 1 | 2012/2/29 | 17:15:15 TO 17:15:30 | 2012/2/29 | 18:00 | 2 | 3 |

| IP HEADER | TCP OR UDP HEADER | MESSAGE ID 0x0011 | CONNECTION DESTINATION IP ADDRESS | CONNECTION DESTINATION PORT NUMBER | CHANNEL ID | PROGRAM ID | RECEIVE START TIME |

FIG.17

| IP HEADER | TCP OR UDP HEADER | MESSAGE ID 0x0023 | CM RELATED INFORMATION ID | CM RELATED INFORMATION TYPE | CM RELATED INFORMATION DATA |

FIG.18

| CHANNEL ID | PROGRAM ID | CM ID | CM RELATED INFORMATION TYPE | CM INSERTION TIME | VALIDITY PERIOD | | DISPLAY ORDER | STORAGE LOCATION |
|---|---|---|---|---|---|---|---|---|
| 1 | 1 | 1 | 1 | 2012/2/29 8:30:00 TO 8:30:30 | 2012/2/29 | 9:00:00 | 1 | 1 |
| 1 | 1 | 1 | 2 | 2012/2/29 8:30:00 TO 8:30:30 | 2012/2/29 | 9:00:00 | | 2 |
| 1 | 1 | 2 | 1 | 2012/2/29 8:30:30 TO 8:30:45 | 2012/2/29 | 9:00:00 | 2 | 3 |
| 1 | 1 | 2 | 3 | 2012/2/29 8:30:30 TO 8:30:45 | 2012/2/29 | 9:00:00 | | 4 |
| 1 | 1 | 3 | 1 | 2012/2/29 8:30:45 TO 8:31:00 | 2012/2/29 | 9:00:00 | 3 | 5 |

| RECEIVE START TIME | PREVIOUS CHANNEL ID | PREVIOUS PROGRAM ID | PREVIOUS CM ID | CURRENT CHANNEL ID | CURRENT PROGRAM ID | CURRENT CM ID | VALIDITY PERIOD |
|---|---|---|---|---|---|---|---|
| 2012/2/29 8:30:01 | 1 | 1 | 1 | 100 | 1 | - | 2012/2/29 9:00:00 |

| CM ID | DISPLAY FREQUENCY FROM START OF PROGRAM VIEWING | DISPLAY FREQUENCY DURING OPERATION PERIOD |
|---|---|---|
| 1 | 4 | 3 |
| 2 | 2 | 1 |
| 3 | 1 | 1 |

| CM ID | DISPLAY FREQUENCY FROM START OF PROGRAM VIEWING | DISPLAY FREQUENCY DURING OPERATION PERIOD |
|---|---|---|
| 1 | 11 | 5 |
| 2 | 6 | 3 |
| 3 | 5 | 2 |

36c

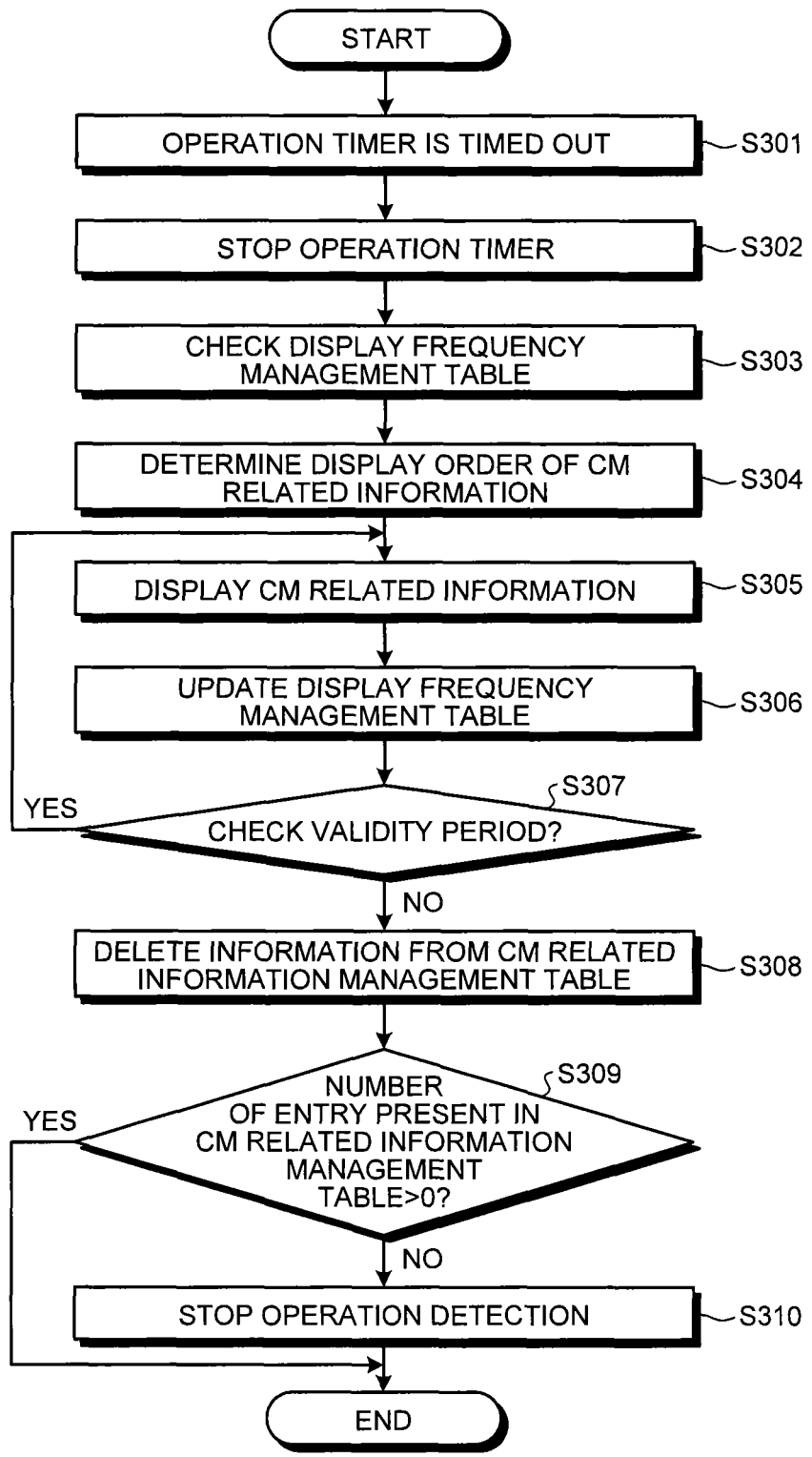

DATA OUTPUT METHOD, DATA OUTPUT PROGRAM, AND TERMINAL DEVICE

CROSS-REFERENCE TO RELATED APPLICATION

This application is based upon and claims the benefit of priority of the prior Japanese Patent Application No. 2012-068228, filed on Mar. 23, 2012, the entire contents of which are incorporated herein by reference.

FIELD

The embodiments discussed herein are directed to a data output method, a data output program, and a terminal device.

BACKGROUND

Broadcasting is conventionally performed such that receiving apparatuses receive programs that are broadcasted from broadcast stations by using wired or wireless communication and then the received programs are viewed by viewers. The programs mentioned here include main programs produced with the production costs provided by sponsors. A broadcast station broadcasts commercial messages (CMs), which are advertisements placed by a sponsor, by inserting the CMs in commercial breaks during a main program. By allowing a viewer, who views the program, to view the CMs produced by the sponsor, the broadcast station advertizes the sponsor or the sponsor's product in return for the sponsor providing the production costs.

When viewing a program, in some cases, the viewer does not view the CMs because the viewer changes channels or operates another device when the CMs are being broadcasted. Furthermore, when the viewer records a program by using a recording device and plays back the recorded program, the viewer may avoid the CMs by fast forwarding through them. If the CMs are not viewed by the viewer, the advertising effectiveness of the CMs is reduced; therefore, providing the production cost of the program has less meaning for the sponsor. Consequently, because the sponsor may possibly discontinue providing the production cost with respect to the program, there may be a case in which producing the program is disturbed and, moreover, it may become difficult in the future to continue broadcasting programs that are produced by sponsors providing the production costs.

Consequently, there is a technology in which a device that records and plays back a program records whether a CM is correctly played back and, if the CM is not played back, the recorded program is controlled such that the program is not deleted. Furthermore, for example, in a Video on Demand (VOD) system, there is also a technology in which CM related information that is related to a CM is inserted into a main program and is broadcast.

Patent Document 1: Japanese Laid-open Patent Publication No. 2001-266482
Patent Document 2: International Publication Pamphlet No. WO 2003/079690

However, with the lifestyle that has become common in recent years in which a viewer always carries a mobile terminal, such as a mobile phone or a tablet device, operates the mobile terminal at any time and location, and watches a display screen on the mobile terminal, the conventional technology above does not cope with the following problem. Namely, it is not possible to cope with a problem in which a CM is not viewed by a viewer because the viewer operates the mobile terminal and watches the display screen of the mobile terminal when the CM is being broadcast. Consequently, there is still a problem in that the advertising effectiveness of a CM that is broadcast between programs is reduced.

SUMMARY

According to an aspect of an embodiment, a data output method is performed in a data sending and receiving system that includes a receiving device and a terminal device that receive data from a sending device. The data output method includes first receiving by the receiving device, from the sending device, first data and second data, which is related to specific data contained in the first data, and first outputting, by the receiving device, the first data to a first output unit, and second receiving, by the terminal device, the second data from the receiving device, and second outputting, by the terminal device, information related to the specific data to a second output unit on the basis of the second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram illustrating an example of the configuration of a connection request packet of a client server type according to the first embodiment;

FIG. 3 is a schematic diagram illustrating an example of the configuration of a response packet of the client server type according to the first embodiment;

FIG. 4 is a schematic diagram illustrating an example of the configuration of a connection request packet of a multi-address transmission type according to the first embodiment;

FIG. 5 is a schematic diagram illustrating an example of the configuration of a response packet of a multi-address transmission type according to the first embodiment;

FIG. 6 is a schematic diagram illustrating an example of the configuration of a connection available notification packet sent by a receiving device, which is the sending source, of a mediation server type according to the first embodiment;

FIG. 7 is a schematic diagram illustrating an example of the configuration of a response packet of the mediation server type according to the first embodiment;

FIG. 8 is a schematic diagram illustrating an example of the configuration of a connection available notification packet sent by a mobile terminal device, which is the sending source, of the mediation server type according to the first embodiment;

FIG. 9A is a schematic diagram illustrating an example of the configuration of a connection destination notification packet sent by a receiving device, which corresponds to the destination, of the mediation server type according to the first embodiment;

FIG. 9B is a schematic diagram illustrating an example of the configuration of a connection destination notification packet sent by a mobile terminal device, which corresponds to the destination, of the mediation server type according to the first embodiment;

FIG. 12 is a schematic diagram illustrating an example of the attributes of a CM according to the first embodiment;

FIG. 13 is a schematic diagram illustrating an example of a CM-related-information storage management table according to the first embodiment;

FIG. 14 is a schematic diagram illustrating an example of the configuration of a storage location notification packet according to the first embodiment;

FIG. 17 is a schematic diagram illustrating an example of the configuration of a CM related information data packet according to the first embodiment;

FIG. 18 is a schematic diagram illustrating an example of the configuration of a CM related information management table according to the first embodiment;

FIG. 19 is a schematic diagram illustrating an example of the configuration of a CM skip management table according to the first embodiment;

FIG. 20A is a schematic diagram illustrating an example of the configuration and the update state of a display frequency management table according to the first embodiment;

FIG. 20B is a schematic diagram illustrating an example of the configuration and the update state of the display frequency management table according to the first embodiment;

FIG. 23 is a flowchart illustrating a process performed when the detection with respect to the mobile terminal device according to the first embodiment ends;

DESCRIPTION OF EMBODIMENTS

Preferred embodiments of the present invention will be explained with reference to accompanying drawings. The embodiments described blow are only examples; therefore, the present invention is not limited thereto. Furthermore, the embodiments can be appropriately used in combination as long as they do not conflict with each other.

Before describing the embodiments, terms used in the embodiments will be described. "Video content" is a "program" that is output from a sending device in a broadcast station during a broadcast. The "program" contains a "main program" and a "commercial message (CM)". The "main program" is a "program" that is produced by funding from the sponsor of a "CM" and is delivered by the broadcast station to viewers. The "CM" is a commercial program that is sent between "programs" in the "main program" and that advertises the sponsor of the "program" or a product supplied by the sponsor. Furthermore, "CM related information" is advertising information that is related to the CM and that advertises, similarly to the CM, the sponsor or the product supplied by the sponsor. "CM-related-information stored information" is simply referred to as "stored information" and is information indicating the storage location in which the "CM related information" is stored.

[a] First Embodiment

Configuration of a Sending and Receiving System

Figure 1:
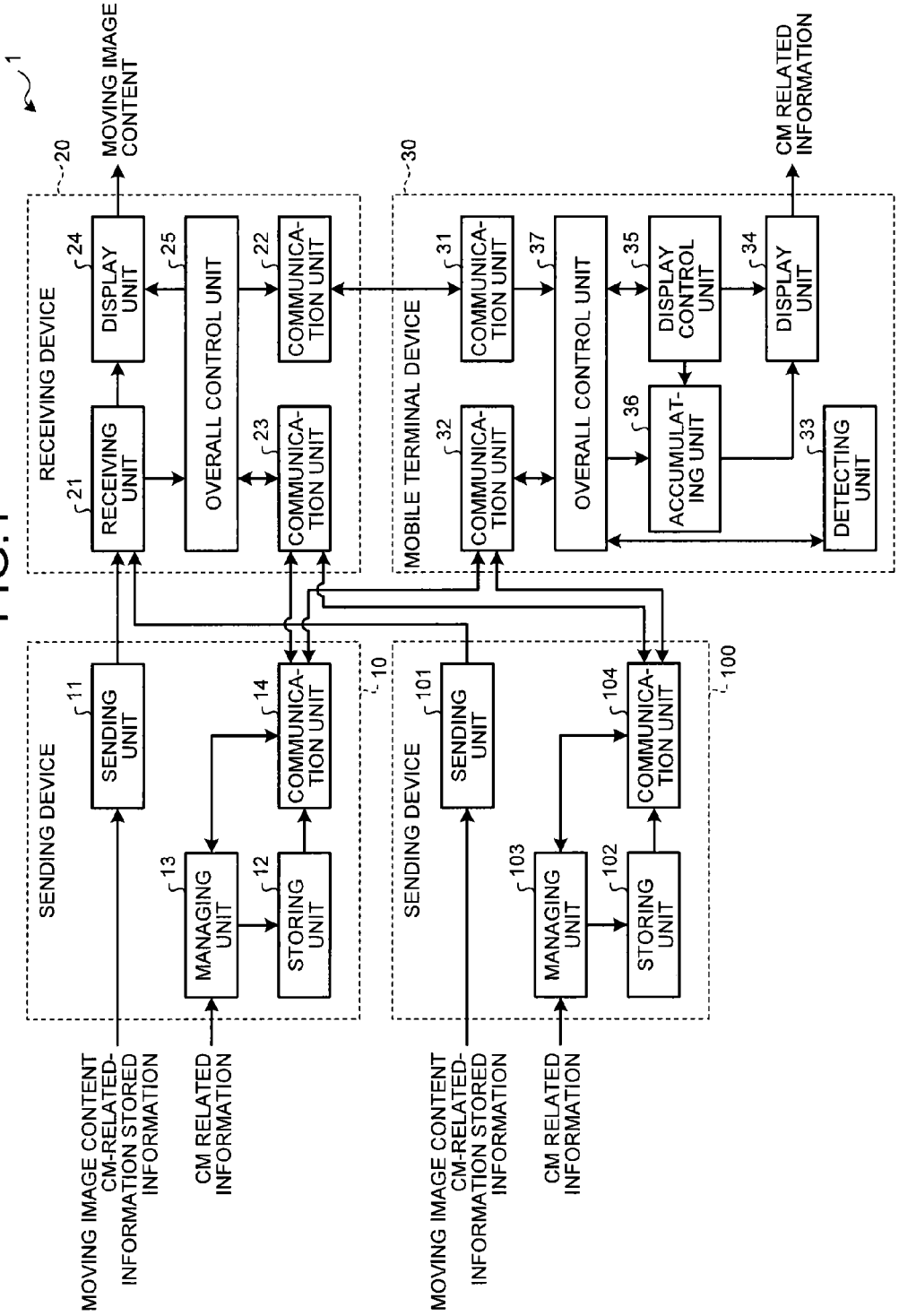
FIG. 1 is a block diagram illustrating the configuration of a sending and receiving system according to a first embodiment.

FIG. 1 is a block diagram illustrating the configuration of a sending and receiving system according to a first embodiment. A sending and receiving system 1 according to the first embodiment includes a sending device 10, a receiving device 20, and a mobile terminal device 30. The sending device 10 is a device on the broadcast station side that broadcasts, for example, video contents. The contents broadcasted by the sending device 10 is not limited to video content. There may also be still image content or sound content. The receiving device 20 is a device on the viewer side that receives, for example, video contents sent from the sending device 10. The mobile terminal device 30 is a small-sized portable terminal, such as a mobile phone, a smart phone, or a tablet device carried by a viewer, that has a communication function that uses wired or wireless communication. The mobile terminal device 30 is not limited to a small-sized portable terminal. It may also be a desktop type terminal device.

The sending device 10, the receiving device 20, and the mobile terminal device 30 are connected such that they can communicate with each other. Furthermore, the receiving device 20 and the mobile terminal device 30 are connected to a local private network, such as the same local area network (LAN), by using a wireless or wired connection via a relay device, such as a router or a hub (not illustrated).

The sending device 10 includes a sending unit 11, a storing unit 12, a managing unit 13, and a communication unit 14. The sending unit 11 sends, to the receiving device 20 via a wired or wireless transmission path, video content and CM-related-information stored information. The managing unit 13 manages the acquired CM related information by storing it in the storing unit 12. The storing unit 12 stores therein the CM related information. The communication unit 14 controls the communication between the receiving device 20 and the mobile terminal device 30.

The receiving device 20 includes a receiving unit 21, a communication unit 22, a communication unit 23, a display unit 24, and an overall control unit 25. The receiving unit 21 receives the video content and the CM-related-information stored information that is sent from the sending device 10. The communication unit 22 controls the communication with the mobile terminal device 30. The communication unit 23 controls the communication with the sending device 10. The display unit 24 displays the video content received from the receiving unit 21. The overall control unit 25 performs the overall control of the receiving device 20.

The mobile terminal device 30 includes a communication unit 31, a communication unit 32, a detecting unit 33, a display unit 34, a display control unit 35, an accumulating unit 36, and an overall control unit 37. The communication unit 31 controls the communication with the receiving device 20. The communication unit 32 controls the communication with the sending device 10. The detecting unit 33 detects the operation with respect to the mobile terminal device 30 or detects the execution of an application in the mobile terminal device 30. The operation that is detected by the detecting unit 33 with respect to the mobile terminal device 30 is the operation performed by the user of, for example, the mobile terminal device 30 with respect to an input unit, such as a keyboard, a pointing device, or a touch panel (not illustrated).

The display unit 34 displays the CM related information. The display control unit 35 controls the display of the CM related information on the display unit 34. The accumulating unit 36 accumulates the CM related information received from the sending device 10 and stores the CM related information. The overall control unit 37 executes the overall control of the mobile terminal device 30.

As illustrated in FIG. 1, similarly to the sending device 10, a sending device 100 also communicates with the receiving device 20 and the mobile terminal device 30. Similarly to the sending device 10, the sending device 100 includes a sending unit 101, a storing unit 102, a managing unit 103, and a communication unit 104. The components in the sending device 10 and the sending device 100 that have the same name have the same function. The sending device 10 and the sending device 100 each are a sending device in an individual broadcast station. Specifically, when a channel of the receiving device 20 is changed by a viewer, a combination is accordingly changed, i.e., the combination of the sending device 10, the receiving device 20, and the mobile terminal device 30, or the combination of the sending device 100, the receiving device 20, and the mobile terminal device 30.

Cooperation with the Receiving Device and the Mobile Terminal Device

In the following, a cooperation method between the receiving device 20 and the mobile terminal device 30 will be described. The receiving device 20 and the mobile terminal device 30 execute a negotiation and establish cooperation. Examples of negotiation methods between the receiving device 20 and the mobile terminal device 30 include three methods: (1) a client server type, (2) a multi-address transmission type, and (3) a mediation server type. In the first embodiment, by using one of the methods (1) to (3), the receiving device 20 and the mobile terminal device 30 execute a negotiation and establish cooperation.

(1) Client Server Type

In the following, a negotiation method used in the client server type will be described. The negotiation method used in the client server model is performed with the following assumption. Namely, the receiving device 20 and the mobile terminal device 30 are connected to a local private network, such as a LAN. It is assumed that the mobile terminal device 30 previously acquires the Internet Protocol (IP) address of the receiving device 20 and the receive port number of the connection request packet.

The port number is the receive port number of a port that receives a connection request packet, which is transmitted to the receiving device 20 by the mobile terminal device 30 on the receiving device 20 side when the mobile terminal device 30 executes the negotiation with the receiving device 20. For example, the IP address of the receiving device 20 is "192.168.1.10" and the receive port number of the connection request packet is "50000". Furthermore, for example, the IP address of the mobile terminal device 30 is "192.168.1.20".

When the receiving device 20 is connected to the LAN, the communication unit 22 waits for the connection request packet sent from the mobile terminal device 30 at the receive port number "50000" of the connection request packet that is previously set. When the mobile terminal device 30 is connected to the LAN, the communication unit 31 sends the connection request packet to the IP address "192.168.1.10" of the receiving device 20 and the receive port number "50000". The receiving device 20 and the mobile terminal device 30 communicate using transmission control protocol (TCP) or user datagram protocol (UDP). When sending and receiving a connection request packet and a response packet, the receiving device 20 and the mobile terminal device 30 may also perform an authentication process that authenticates a counterpart device.

Connection Request Packet of the Client Server Type

FIG. 2 is a schematic diagram illustrating an example of the configuration of a connection request packet of a client server type according to the first embodiment. The connection request packet of the client server type includes the following fields in the following order: IP header, TCP or UDP header, message identifier (ID) "0x0001", device type "0x1002", response destination IP address "192.168.1.20", and response destination port number "60000". The message ID "0x0001" indicates that a packet is a connection request packet. The device type indicates the type of device that sends a connection request packet. The example illustrated in FIG. 2 indicates that the device that sends the connection request packet is the mobile terminal device 30. The response destination IP address and the response destination port number indicate the IP address and the port number, respectively, of the response destination device that sends a response packet to the device that sends the connection request packet.

Response Packet of the Client Server Model

When the communication unit 22 receives a connection request packet from the mobile terminal device 30, the receiving device 20 extracts, from the connection request packet, the response destination IP address and the response destination port number. Then, the receiving device 20 sends a response packet to the mobile terminal device 30 that is specified by the extracted response destination IP address and the extracted response destination port number. FIG. 3 is a schematic diagram illustrating an example of the configuration of a response packet of the client server type according to the first embodiment. The response packet includes the following fields in the following order: IP header, TCP or UDP header, and message ID "0x0002". The message ID "0x0002" indicates that the packet is a response packet.

By sending and receiving the connection request packet and the response packet as described above, the receiving device 20 and the mobile terminal device 30 execute the negotiation and establishes cooperation. In the above example, the connection request packet is sent from the mobile terminal device 30 to the receiving device 20; however, the connection request packet may also be sent from the receiving device 20 to the mobile terminal device 30.

(2) Multi-Address Transmission Type

In the following, a description will be given of a negotiation method used in the multi-address transmission type; however, a description of the part of the negotiation method that is the same as that used in the client server type will be omitted. The negotiation method used in the multi-address transmission type is performed with the following assumption. Namely, the receiving device 20 and the mobile terminal device 30 are connected to a local private network, such as a LAN. It is assumed that the mobile terminal device 30 previously acquires the Internet Protocol (IP) address of the receiving device 20. Furthermore, it is assumed that the mobile terminal device 30 previously acquires the IP address and the receive port number of the multi-address transmission destination of the connection request packet.

The IP address, for example, of the receiving device 20 is "192.168.1.10". Furthermore, the IP address, for example, of the multi-address transmission destination of the connection request packet is "192.168.1.255" and the receive port number of the connection request packet is "50000". Furthermore, the IP address, for example, of the mobile terminal device 30 is "192.168.1.20".

When the receiving device 20 is connected to the LAN, the communication unit 22 periodically sends, using a UDP, a connection request packet to the IP address "192.168.1.255" and the receive port number "50000", which are used for multi-address transmission (broadcast). However, the method is not limited to a broadcast and a multicast may also be used.

Connection Request Packet of the Multi-Address Transmission Type

FIG. 4 is a schematic diagram illustrating an example of the configuration of a connection request packet of a multi-address transmission type according to the first embodiment. The connection request packet of the multi-address transmission type includes the following fields in the following order: IP header, UDP header, message ID "0x0001", device type "0x1001", response destination IP address "192.168.1.10", and response destination port number "60000".

When the mobile terminal device 30 is connected to the LAN, the communication unit 31 waits for, at the receive port number "50000", a connection request packet sent from the receiving device 20. When the communication unit 31 in the mobile terminal device 30 receives the connection request packet that is sent by the communication unit 22 in the receiving device 20 using multi-address transmission, the communication unit 31 sends a response packet to the response destination IP address "192.168.1.10" and the response destination port number "60000", which are contained in the connection request packet. The connection request packet is sent from the receiving device 20 to the mobile terminal device 30 by using a UDP. Furthermore, the response packet is sent from the mobile terminal device 30 to the receiving device 20 by using a TCP or a UDP. When sending and receiving the connection request packet and the response packet, the receiving device 20 and the mobile terminal device 30 may also perform an authentication process that authenticates a counterpart device.

Response Packet of Multi-Address Transmission

FIG. 5 is a schematic diagram illustrating an example of the configuration of a response packet of a multi-address transmission type according to the first embodiment. The response packet of the multi-address transmission type includes the following fields in the following order: IP header, TCP or UDP header, and message ID "0x0002". In the example illustrated in FIG. 5, the message ID "0x0002" indicates that the packet is a response packet. Furthermore, the communication IP address "192.168.1.20" indicates the IP address of the sending source of the response packet. Furthermore, the communication IP port number "55000" indicates the receive port number of the sending source of the response packet.

By sending and receiving the connection request packet and the response packet as described above, the receiving device 20 and the mobile terminal device 30 execute the negotiation described above and establish cooperation. In the above example, the connection request packet is sent from the receiving device 20 to the mobile terminal device 30 by using multi-address transmission; however, the connection request packet may also be sent from the mobile terminal device 30 to the receiving device 20 by using the multi-address transmission.

(3) Mediation Server Type

In the following, a description will be given of a negotiation method used in the mediation server type; however, a description of the part of the negotiation method that is the same as that used in the client server type or the multi-address transmission type will be omitted. The negotiation method used in the mediation server type is performed with the following assumption. Namely, the receiving device 20, the mobile terminal device 30, and a mediation server (not illustrated) are connected to a local private network, such as a LAN and both the receiving device 20 and the mobile terminal device 30 previously acquire the IP address and the receive port number of the mediation server. The receive port number of the mediation server is a port number that receives a connection available notification packet, which will be described later.

The IP address, for example, of the receiving device 20 is "192.168.1.10" and the receive port number is "60000". Furthermore, the IP address, for example, of the mediation server is "192.168.1.100" and the receive port number is "50000". Furthermore, the IP address, for example, of the mobile terminal device 30 is "192.168.1.20" and the receive port number is "55000".

When the receiving device 20 is connected to the LAN, the communication unit 22 sends a connection available notification packet to the IP address "192.168.1.100" and the receive port number "50000" of the mediation server. The receiving device 20 and the mediation server communicate using a TCP or a UDP. Furthermore, when sending and receiving the connection available notification packet and the response packet, the receiving device 20 and the mediation server may also perform an authentication process that authenticates a counterpart device.

Connection Request Packet of the Mediation Server Type

FIG. 6 is a schematic diagram illustrating an example of the configuration of a connection available notification packet sent by a receiving device, which is the sending source, of a mediation server type according to the first embodiment. The connection available notification packet of the receiving device, which is the sending source, includes the following fields in the following order: IP header, TCP or UDP header, message ID "0x0001", device type "0x1001", connection destination IP address "192.168.1.10", and connection destination port number "60000". In the example illustrated in FIG. 6, the message ID "0x0001" indicates that a packet is a connection available notification packet. Furthermore, in FIG. 6, the connection destination IP address and the connection destination port number indicate the IP address "192.168.1.10" and the receive port number "60000", respectively, of the receiving device 20.

Response Packet of the Mediation Server Type

When the mediation server receives a connection available notification packet from the receiving device 20, the mediation server sends a response packet whose destination is the receiving device. FIG. 7 is a schematic diagram illustrating an example of the configuration of a response packet of the mediation server type according to the first embodiment. The response packet of the mediation server type includes the following fields in the following order: IP header, TCP or UDP header, and message ID "0x0002". Furthermore, in FIG. 7, the message ID "0x0002" indicates that a packet is a response packet.

When the mobile terminal device 30 is connected to the LAN, the communication unit 31 sends a connection available notification packet to the IP address "192.168.1.100" and the port number "50000" of the mediation server. The mobile terminal device 30 and the mediation server communicate by using a TCP or a UDP. When sending and receiving the connection available notification packet and the response packet, the mobile terminal device 30 and the mediation server may also perform an authentication process that authenticates a counterpart device.

Connection Available Notification Packet of the Mediation Server

FIG. 8 is a schematic diagram illustrating an example of the configuration of a connection available notification packet sent by a mobile terminal device, which is the sending source, of the mediation server type according to the first embodiment.

The connection available notification packet of the mobile terminal device, which is the sending source, includes the following fields in the following order: IP header, TCP or UDP header, message ID "0x0001", device type "0x1002", connection destination IP address "192.168.1.20", and the connection destination port number "55000". In the example illustrated in FIG. 8, the message ID "0x0001" indicates that a packet is a connection available notification packet. Furthermore, in the example illustrated in FIG. 8, the connection destination IP address and the connection destination port number indicate the IP address "192.168.1.20" and the port number "55000", respectively, of the mobile terminal device 30.

When the mediation server receives a connection available notification packet from the mobile terminal device 30, if the mediation server determines that the pairing of the receiving device 20 and the mobile terminal device 30 is available, the mediation server sends a connection destination notification packet to the receiving device 20 and the mobile terminal device 30. The mediation server then determines whether the pairing is available on the basis whether the connection available notification packet is received from each of the receiving device 20 and the mobile terminal device 30. Alternatively, the mediation server may also determine whether the pairing is available on the basis whether each of the receiving device 20 and the mobile terminal device 30 meets the performance, the function, or the security level requested by the counterpart device. At this point, the receiving device 20 and the mobile terminal device 30 may also contain, in the connection available notification packet that is sent to the mediation server, information on their own performance, function, or security level.

Connection Destination Notification Packet of the Mediation Server Type

FIG. 9A is a schematic diagram illustrating an example of the configuration of a connection destination notification packet sent by a receiving device, which corresponds to the destination, of the mediation server type according to the first embodiment. FIG. 9B is a schematic diagram illustrating an example of the configuration of a connection destination notification packet sent by a mobile terminal device, which corresponds to the destination, of the mediation server type according to the first embodiment. When the mediation server determines that the pairing of the receiving device 20 and the mobile terminal device 30 is available, the mediation server sends the connection destination notification packet illustrated in FIG. 9A to the receiving device 20 and sends the connection destination notification packet illustrated in FIG. 9B to the mobile terminal device 30.

As illustrated in FIG. 9A, the connection destination notification packet that is sent by the mediation server to the receiving device 20 contains the following fields in the following order: IP header, TCP or UDP header, message ID "0x0003", connection destination IP address "192.168.1.20", and connection destination port number "55000". Furthermore, in the example illustrated in FIG. 9A, the message ID "0x0003" indicates that a packet is a connection destination notification packet. In the example illustrated in FIG. 9A, the connection destination IP address and the connection destination port number are IP address "192.168.1.20" and the port number "55000", respectively, of the mobile terminal device 30.

As illustrated in FIG. 9B, the connection destination notification packet, which is sent to the mobile terminal device 30 by the mediation server, contains the following fields in the following order: IP header, TCP or UDP header, message ID "0x0003", connection destination IP address "192.168.1.10", and connection destination port number "60000". Furthermore, in the example illustrated in FIG. 9B, the message ID "0x0003" indicates that a packet is a connection destination notification packet. Furthermore, in FIG. 9B, the connection destination IP address and the connection destination port number indicates the IP address "192.168.1.10" and the port number "60000", respectively, of the receiving device 20.

The receiving device 20 and the mobile terminal device 30, which each have received the connection destination notification packet complete the negotiation by connecting, using a TCP or a UDP, to the connection destination device in accordance with the connection destination IP address and the connection destination port number contained in the connection destination notification packet. At the time of the negotiation, the receiving device 20 and the mobile terminal device 30 may also perform an authentication process that authenticates a counterpart device.

Send Method of CM-Related-Information Stored Information

Figures 10, 11:
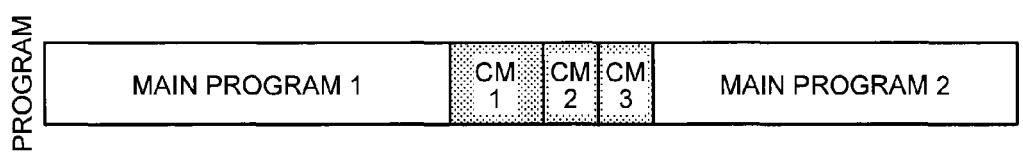
FIG. 10 is a schematic diagram illustrating the data structure of a descriptor indicating CM-related-information stored information according to the first embodiment.
FIG. 11 is a schematic diagram illustrating an example of the configuration of a video content according to the first embodiment.

The sending device 10 sends, by using the sending unit 11, the CM-related-information stored information together with the video content. In the following, a send method of the CM-related-information stored information will be described. FIG. 10 is a schematic diagram illustrating the data structure of a descriptor indicating CM-related-information stored information according to the first embodiment. The sending device 10 that is used, for example, for digital broadcasting, sends video content as a Transport Stream (TS) packet in line with the MPEG-2 system standard. In the MPEG-2 system standard, a program association table (PAT), a program map table (PMT), or the like is used in order to identify a TS packet for video content. In the first embodiment, a descriptor indicating the CM-related-information stored information is added to a PMT that defines the descriptor used for describing, for example, a method for encoding video content.

As illustrated in FIG. 10, the descriptor (CMDataServer_descriptor), which indicates the CM-related-information stored information, contains the following fields in the following order: descriptor_tag, descriptor_length, IP_Address, IP_Port, Channel_ID, and Program_ID. The descriptor_tag is an 8-bit field that stores therein information for identifying the type of descriptor, i.e., stores therein one of the values "64" to "255", each of which indicates a private value for each user.

The descriptor_length is an 8-bit field that stores therein information indicating the length of the byte of the descriptor that is located immediately after the descriptor_length field. For example, "10" is stored. The IP_Address is a 32-bit field that stores therein the IP address of the storage location in which the CM related information is stored. The IP_Port is a 16-bit field that stores therein a port number of a storage location in which the CM related information is stored. The Channel_ID is a 16-bit field that stores therein identification information on a channel through which video content or the like is sent. A unique number is allocated to the Channel_ID for each channel (for example, a broadcast station, etc.). The Program_ID is a 16-bit field that stores therein the ID for identifying video content. A unique number is allocated to the Program_ID for each video content in each channel (for example, a broadcast station, etc.).

By analyzing the CMDataServer_descriptor contained in the PMT, the receiving device 20 acquires the CM-related-information stored information (the IP address, the port number, the channel ID, and the program ID). As another send method of the CM-related-information stored information, it may also be possible to use a method for directly sending, as an IP packet, the CM-related-information stored information to the receiving device 20 or to use a method for sending it to the receiving device 20 by using IP Data Cast (IPDC).

Configuration of Video Content and the Display Rule

In the following, a description will be given of an example of the configuration of video content that corresponds to a program according the first embodiment. FIG. 11 is a schematic diagram illustrating an example of the configuration of video content according to the first embodiment. FIG. 12 is a schematic diagram illustrating an example of the attributes of a CM according to the first embodiment. As illustrated in FIG. 11, the sending device 10 sends a program in the order of a main program 1, CM1, CM2, CM3, and a main program 2. As illustrated in FIG. 12, the broadcast length and the type of CM are "30 seconds" and a "provided CM to a program" for the CM1, "15 seconds" and a "provided CM to a program" for the CM2, and "15 seconds" and a "spot CM" for the CM3, respectively.

In the first embodiment, for example, the advertising ratio is used as the display rule of the CM related information displayed on the mobile terminal device 30. Specifically, the first priority is given to the broadcast length of a CM and the second priority is given to the type of the CM. More specifically, for the display order, a higher priority is given to a CM that has a longer broadcast length or to a CM whose type is a "provided CM to a program" rather than a "spot CM". In the example illustrated in FIG. 12, the advertising ratio of the CM1, CM2, and CM3 is 2:1:1. In other words, as described above, when taking into consideration the broadcast length and the type of CM, in the first embodiment, the display order of the CMs becomes the following: CM1, CM2, and then CM3. Instead of using the display rule based on the advertising ratio, the display order may also be arbitrarily determined by the sending side (for example, a broadcast station) of the program.

Content of the CM Related Information

The CM related information includes the following items: name of a company that produces confections, name of the confection, feature of the confection, and its selling point. These items contained in the information are output from the mobile terminal device 30 as text, a still image, a moving image, and a sound.

In the first embodiment, a description will be given of a case in which video content is sent from the sending device 10 to the receiving device 20 using digital broadcasting. The sending device 10 receives an input of video content that includes a main program and a CM, the CM-related-information stored information, and the CM related information. The information may also be previously stored in a storage device and the sending device 10 may read the information from the storage device and may send the information.

The sending unit 11 sends video content that is packetized in a transport stream in line with the MPEG-2 system standard. Specifically, the sending unit 11 sends, as the CM-related-information stored information, the video content by adding, in the descriptor area in the PMT, the CMDataServer_descriptor illustrated in FIG. 10 to the video content. In this example, it is assumed that, in the CMDataServer_descriptor, the IP address and the port number of the communication unit 14 is set to the IP_Address and the IP_Port, respectively, the Channel_ID is set to 1, and the Program_ID is set to 1.

CM-Related-Information Storage Management Table

The managing unit 13 stores the CM related information in the storing unit 12, creates a CM-related-information storage management table, and stores the table in the storing unit 12. FIG. 13 is a schematic diagram illustrating an example of a CM-related-information storage management table according to the first embodiment. A CM-related-information storage management table 12a includes the following columns: channel ID, program ID, CM ID, CM type, CM related information type, CM insertion time, validity period, display order, and storage location.

The channel ID and the program ID are the same as those stored in the CMDataServer_descriptor described above. The CM ID is a value uniquely allocated to each CM. In the first embodiment, the value of 1 is allocated to the CM1, the value of 2 is allocated to the CM2, and the value of 3 is allocated to the CM3. For the CM type, the value of 1 is allocated to the CM provided to the program and the value of 2 is allocated to the spot CM. The CM related information type indicates the type of the CM related information provided; the value of 1 is allocated to the text, the value of 2 is allocated to the still image, and the value of 3 is allocated to the moving image.

The CM insertion time indicates the date and time at which the CM is sent. The CM insertion time contains information on the time at which the CM is sent, i.e., information on the broadcast time of the CM. The validity period indicates the time period during which the CM related information is valid. The validity period is, for example, from the start of the program transmission to the end of the program transmission. The display order indicates the display order of the CM related information. The storage location indicates the location of the CM related information in the storing unit 12, e.g., it indicates the address that indicates the stored location of the information. The managing unit 13 determines the display order of the CM on the basis of the CM insertion time and the CM related information type.

The receiving device 20 and the mobile terminal device 30 previously execute a negotiation and synchronize the time. Examples of methods of time synchronization includes a method in which either one of the receiving device 20 and the mobile terminal device 30 is used as a reference device and a method of synchronizing the time by both the receiving device 20 and the mobile terminal device 30 connecting to time servers (network time protocol (NTP) server, etc.) having the same time source.

The receiving device 20 receives, by using the receiving unit 21, the video content and the CM-related-information stored information sent from the sending device 10. Then, the receiving device 20 displays the received video content on the display unit 24. Furthermore, the receiving device 20 detects the CMDataServer_descriptor from the descriptor area of the PMT contained in the CM-related-information stored information that is received by the receiving unit 21. Then, the receiving device 20 extracts, by using the receiving unit 21, the storage location of the CM related information, such as, the IP address and the receive port number of the sending device 10, the channel ID, and the program ID and notifies the overall control unit 25 of the storage location.

Storage Location Notification Packet

The receiving device 20 sends, to the communication unit 31 in the mobile terminal device 30 by using the communication unit 22, the storage location notification packet in the TCP or UDP format. FIG. 14 is a schematic diagram illustrating an example of the configuration of a storage location notification packet according to the first embodiment. The storage location notification packet includes the following fields in the following order: IP header, TCP or UDP header, message ID "0x0011", connection destination IP address, connection destination port number, channel ID, program ID, and receive start time of video content. In the example illustrated in FIG. 14, the message ID "0x0011" indicates that a packet is a storage location notification packet. Furthermore, in FIG. 14, for example, the channel ID is "0x0001" and the program ID is "0x0001". Furthermore, in FIG. 14, the connection destination IP address is the IP address of the sending device 10. Furthermore, in FIG. 14, the connection destination port number is the receive port number of the sending device 10.

CM Related Information Acquisition Request Packet

Figure 15:
FIG. 15 is a schematic diagram illustrating an example of the configuration of a CM related information acquisition request packet according to the first embodiment.

The communication unit 32 sends the CM related information acquisition request packet to the communication unit 14 in the sending device 10 on the basis of the storage location notification packet, and thereby the mobile terminal device 30 acquires the CM related information from the sending device 10. FIG. 15 is a schematic diagram illustrating an example of the configuration of a CM related information acquisition request packet according to the first embodiment. As illustrated in FIG. 15, the CM related information acquisition request packet includes the following fields in the following order: IP header, TCP or UDP header, message ID "0x0021", channel ID, and program ID. In the example illustrated in FIG. 15, the message ID "0x0021" indicates that a packet is a CM related information acquisition request packet. Furthermore, in FIG. 15, for example, the channel ID is "0x0001" and the program ID is "0x0001".

CM Related Information Notification Packet

Figure 16:
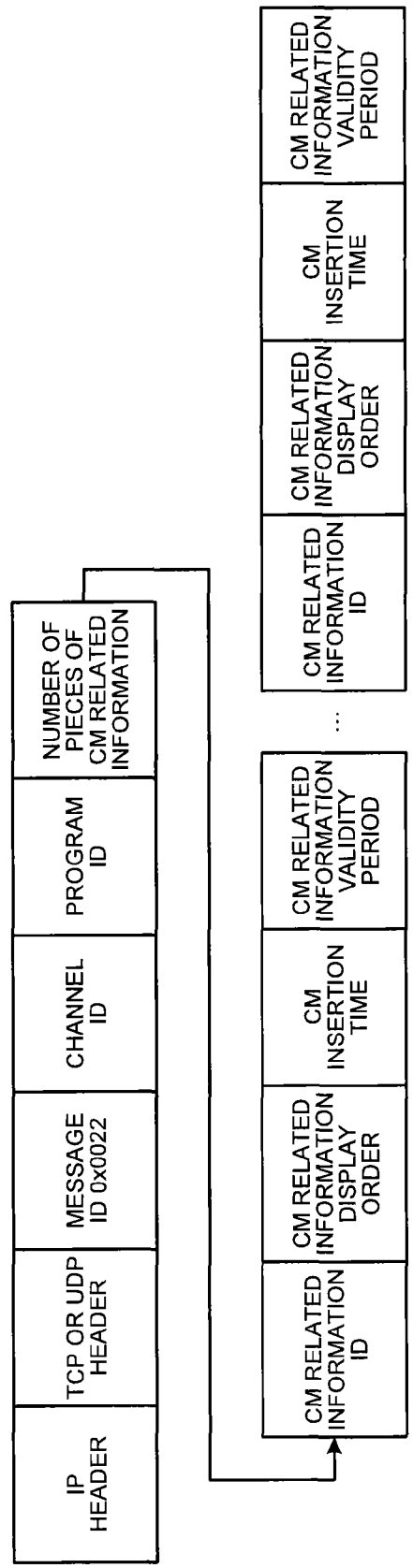
FIG. 16 is a schematic diagram illustrating an example of the configuration of a CM related information notification packet according to the first embodiment.

When the sending device 10 receives the CM related information acquisition request packet from the mobile terminal device 30, the sending device 10 sends the CM related information notification packet to the mobile terminal device 30. FIG. 16 is a schematic diagram illustrating an example of the configuration of a CM related information notification packet according to the first embodiment. The CM related information notification packet includes the following fields in the following order: IP header, TCP or UDP header, message ID "0x0022", channel ID, program ID, and the number of pieces of CM related information. Furthermore, subsequent to the number of pieces of CM related information, the CM related information notification packet includes the following fields in the following order: CM related information ID, CM related information display order, CM insertion time, and CM related information validity period. As illustrated in FIG. 16, the number of fields between the CM related information ID and the CM related information validity period, which are repeatedly present, is the same as the number of pieces of CM related information. Furthermore, in FIG. 16, for example, the channel ID is "0x0001" and the program ID is "0x0001".

In the example illustrated in FIG. 16, the message ID "0x0022" indicates that a packet is a CM related information notification packet. Furthermore, the number of pieces of the CM related information illustrated in FIG. 16 is "5" because the value that indicates the storage location illustrated in FIG. 13 is 5. Furthermore, the CM related information ID illustrated in FIG. 16 corresponds to the CM ID illustrated in FIG. 13. The CM related information display order illustrated in FIG. 16 corresponds to the display order illustrated in FIG. 13. The CM insertion time corresponds to the CM insertion time illustrated in FIG. 13. The CM related information validity period illustrated in FIG. 16 corresponds to the validity period illustrated in FIG. 13.

CM Related Information Data Packet

The mobile terminal device 30 acquires the CM related information data by receiving the CM related information data packet from the sending device 10 together with the CM related information notification packet that is received from the sending device 10. FIG. 17 is a schematic diagram illustrating an example of the configuration of a CM related information data packet according to the first embodiment. As illustrated in FIG. 17, the CM related information data packet includes the following fields in the following order: IP header, TCP or UDP header, message ID "0x0023", CM related information ID, CM related information type, and CM related information data.

In the example illustrated in FIG. 17, the message ID "0x0023" indicates that a packet is a CM related information data packet. Furthermore, the CM related information ID illustrated in FIG. 17 corresponds to the CM ID illustrated in FIG. 13. The CM related information type illustrated in FIG. 17 corresponds to the display order illustrated in FIG. 13. In the first embodiment, the CM related information notification packet and the CM related information data packet are different packets; however, they may be arranged and sent as a single packet.

CM Related Information Management Table

In the mobile terminal device 30, the display control unit 35 creates or updates a CM related information management table 36a on the basis of the information contained in a notification sent from the overall control unit 37. FIG. 18 is a schematic diagram illustrating an example of the configuration of a CM related information management table according to the first embodiment. The CM related information management table 36a contains therein the following columns in the following order: channel ID, program ID, CM ID, CM related information type, CM insertion time, validity period, display order, and storage location.

The channel ID is information for identifying a channel that is airing a program that is received by the receiving device

20. The program ID is information for identifying a program that is received by the receiving device 20 and that is being displayed. The CM ID is identification information of a CM that is received by the receiving device 20, that is inserted in CM breaks during a main program, and that is displayed. The CM insertion time is the time period for which the CM is inserted in a CM break during the main program. The validity period is the time period for which the CM can be inserted in a CM break during the main program. The display order is the order of displaying the CM related information that is related to the CM on the mobile terminal device 30. The storage location indicates the location in which the CM related information related to the CM is stored.

The communication unit 32 receives the CM related information notification packet and the CM related information data packet from the sending device 10. The communication unit 32 extracts, from the CM related information notification packet, the channel ID, the program ID, the number of pieces of CM related information, the CM related information ID, the CM related information display order, the CM insertion time, and the CM related information validity period. At this point, the number of fields between the CM related information ID and the CM related information validity period that are extracted corresponds to the number of pieces of CM related information.

Furthermore, the communication unit 32 extracts, from the CM related information data packet, the CM related information ID, the CM related information type, and the CM related information data. The communication unit 32 notifies the overall control unit 37 of the extracted information. The overall control unit 37 stores and accumulates, as the CM related information data and in the CM related information management table 36a in the accumulating unit 36, the information contained in a notification sent from the communication unit 32.

The overall control unit 37 notifies the display control unit 35 of the channel ID, the program ID, the number of pieces of CM related information, the CM related information ID, the CM related information display order, the CM insertion time, the CM related information validity period, the CM related information type, and the CM related information accumulation location. The CM related information accumulation location is, for example, an address that indicates the storage location. At this point, the number of fields between the CM related information ID and the CM related information validity period that is sent as a notification corresponds to the number of pieces of CM related information. The display control unit 35 creates or updates the CM related information management table 36a on the basis of the information contained in a notification sent from the overall control unit 37.

CM Skip Management Table

In the mobile terminal device 30, when the display control unit 35 receives a new storage location notification packet from the receiving device 20, the display control unit 35 searches the CM related information management table 36a on the basis of the receive start time and then determines whether the receive start time is included in the CM insertion time. This determination is performed when, for example, a channel is changed to another channel while a CM is being broadcast. The CM insertion time is an arbitrary time that includes before and after the CM insertion time, e.g., 1 minute.

If the receive start time is included in the CM insertion time, the display control unit 35 records each piece of the information in a CM skip management table 36b in the accumulating unit 36. FIG. 19 is a schematic diagram illustrating an example of the configuration of a CM skip management table according to the first embodiment. As illustrated in FIG. 19, the CM skip management table 36b includes the following fields in the following order: receive start time, previous channel ID, previous program ID, previous CM ID, current channel ID, current program ID, current CM ID, and validity period (validity period of a previous CM ID).

Display Frequency Management Table

For the display frequency of the CM related information displayed on the display unit 34, the display control unit 35 records, in the display frequency management table, the display frequency accumulated after the program viewing is started and the display frequency during the operation period for which the operation of mobile terminal device 30 or an application running on the mobile terminal device 30 is detected. A display frequency management table 36c records, for each CM ID, the display frequency from the start of the viewed program (after the displaying of the CM related information is started) and the display frequency during the operation period. FIGS. 20A and 20B are schematic diagrams each illustrating an example of the configuration and the update state of a display frequency management table according to the first embodiment. The records of the display frequencies are updated every time the CM related information is displayed, e.g., from the state illustrated in FIG. 20A to the state illustrated in FIG. 20B.

Basic Process Performed by the Mobile Terminal Device

Figure 21:
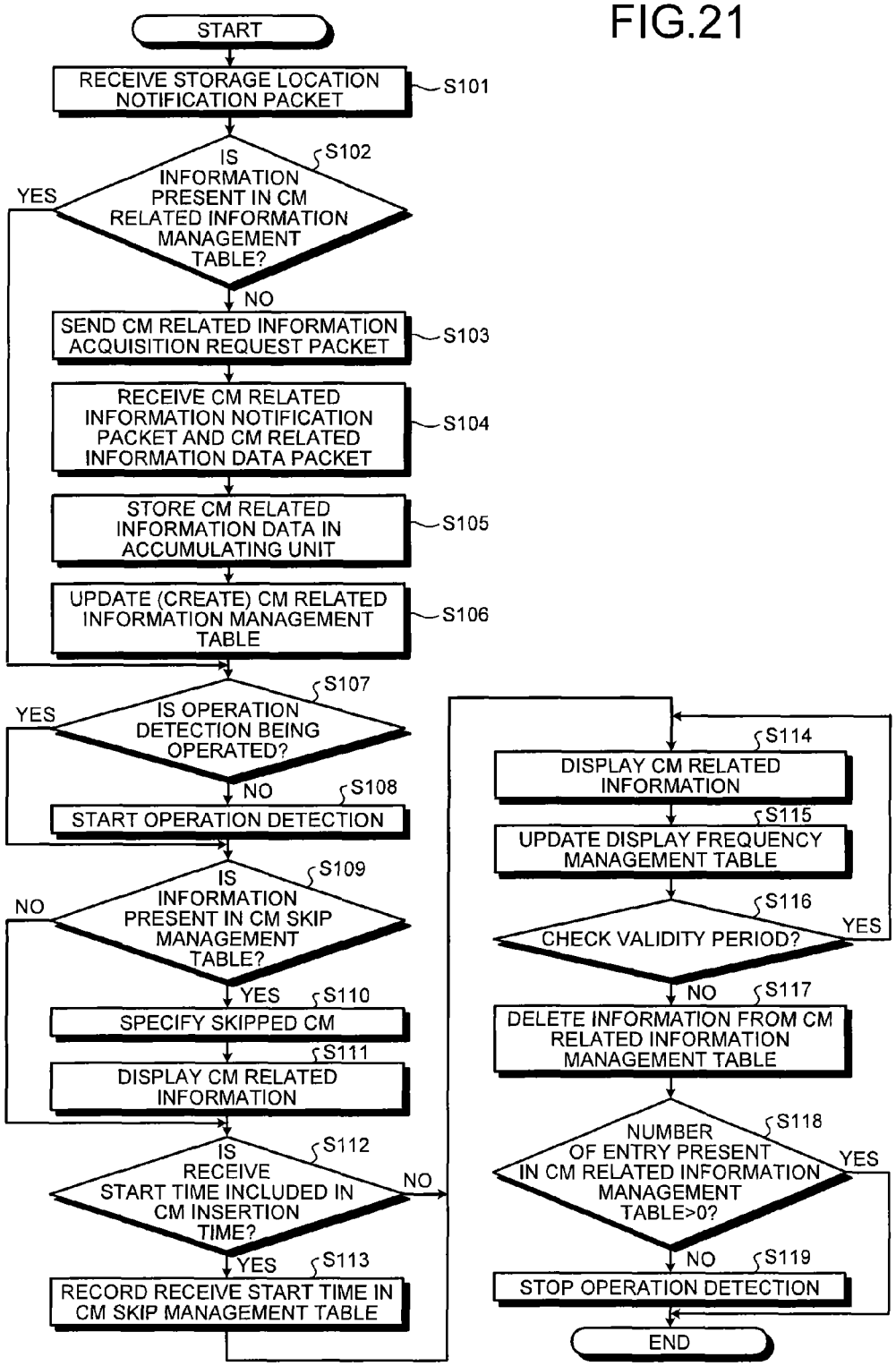
FIG. 21 is a flowchart illustrating a basic process performed by a mobile terminal device according to the first embodiment.

FIG. 21 is a flowchart illustrating a basic process performed by a mobile terminal device according to the first embodiment. First, in the mobile terminal device 30, the communication unit 31 receives a storage location notification packet from the receiving device 20 (Step S101). Then, the communication unit 31 notifies the overall control unit 37 of the connection destination IP address, the connection destination port number, the channel ID, the program ID, and the receive start time. Then, the overall control unit 37 notifies the display control unit 35 of the channel ID, the program ID, and the receive start time. The display control unit 35 refers to the CM related information management table, which will be described later, and determines whether the target CM related information is present (Step S102).

If the target CM related information is present (Yes at Step S102), the display control unit 35 moves the process to Step S107. In contrast, if the target CM related information is not present (No Step S102), the display control unit 35 moves the process to Step S103. Then, the communication unit 32 sends the CM related information acquisition request packet to the communication unit 14 in the sending device 10 (Step S103).

When the communication unit 14 in the sending device 10 receives the CM related information acquisition request packet from the mobile terminal device 30, the communication unit 14 extracts the channel ID and the program ID and notifies them to the managing unit 13. The managing unit 13 acquires, from the CM-related-information storage management table on the basis of the notified channel ID and the program ID, the CM ID, the CM insertion time, the validity period, and the display order contained in the CM related information and sends them as the CM related information notification packet from the communication unit 14 to the mobile terminal device 30. Furthermore, the managing unit 13 acquires, from the storing unit 12 on the basis of the stored information, the CM related information data and sends it in the CM related information data packet from the communication unit 14 to the mobile terminal device 30.

Then, the communication unit 32 receives the CM related information notification packet and the CM related information data packet from the sending device 10 (Step S104). Then, the overall control unit 37 extracts the CM related information data from the CM related information data packet that is received by the communication unit 32 and then stores the CM related information data in the accumulating unit 36 (Step S105). Then, the overall control unit 37 updates (creates) the CM related information management table 36a on the basis of the information contained in the CM related information notification packet or in the CM related information data packet (Step S106).

Furthermore, the overall control unit 37 determines, by using the detecting unit 33, whether an operation with respect to the mobile terminal device 30 or an application running on the mobile terminal device 30 is present (Step S107). If the overall control unit 37 determines that there is an operation with respect to the mobile terminal device 30 or there is an application running on the mobile terminal device 30 (Yes at Step S107), the overall control unit 37 moves the process to Step S109. In contrast, if the overall control unit 37 determines that there is no operation with respect to the mobile terminal device 30 nor an application running on the mobile terminal device 30 (No at Step S107), the overall control unit 37 moves the process to Step S108. At Step S108, the overall control unit 37 starts detecting, by using the detecting unit 33, whether an operation is running with respect to the mobile terminal device 30 or an application is running on the mobile terminal device 30.

At Step S109, the display control unit 35 determines whether the channel ID and the program ID contained in a notification sent from the receiving device 20 correspond to the previous channel ID and the previous program ID, respectively, in the CM skip management table 36b. If the display control unit 35 determines that the channel ID and the program ID contained in a notification sent from the receiving device 20 correspond to the previous channel ID and the previous program ID, respectively, in the CM skip management table 36b (Yes at Step S109), the display control unit 35 moves the process to Step S110. In contrast, if the display control unit 35 determines that the channel ID and the program ID contained in a notification sent from the receiving device 20 does not correspond to the previous channel ID and the previous program ID in the CM skip management table 36b (No at Step S109), the display control unit 35 moves the process to Step S112.

At Step S110, the display control unit 35 determines which CM insertion time contains, in the CM related information management table 36a, the receive start time of the storage location notification packet obtained at this time and the receive start time recorded in the CM skip management table 36b. Then, the display control unit 35 inserts the CM related information corresponding to the CM insertion time specified at Step S111 and displays the CM related information on the display unit 34 (Step S111).

Then, the display control unit 35 searches the CM related information management table 36a on the basis of the receive start time of the storage location notification packet and determines whether the receive start time is included in the CM insertion time (Step S112). If the display control unit 35 determines that the receive start time is included in the CM insertion time (No at Step S112), the display control unit 35 moves the process to Step S114. In contrast, if the display control unit 35 determines that the receive start time is not included in the CM insertion time (Yes at Step S112), the display control unit 35 moves the process to Step S113.

At Step S113, the display control unit 35 records, in the CM skip management table 36b, the receive start time included in the CM insertion time. Then, the display control unit 35 displays the CM related information on the display unit 34 on the basis of the display order in the CM related information management table 36a (Step S114).

Then, the display control unit 35 increments the display frequency of the CM related information displayed on the display unit 34 at Step S114 by one and updates the display frequency management table 36c (Step S115). The display control unit 35 checks the validity period of the CM related information management table 36a (Step S116). Then, if CM related information that exceeds the validity period is present in the CM related information management table 36a (No at Step S116), the display control unit 35 deletes the target CM related information from the CM related information management table 36a (Step S117). In contrast, if CM related information that exceeds the validity period is not present in the CM related information management table 36a (Yes at Step S116), the display control unit 35 moves the process to Step S114.

Subsequent to Step S117, the display control unit 35 determines whether an entry is present in the CM related information management table 36a (Step S118). If no entry is present in the CM related information management table 36a (No at Step S118), the display control unit 35 stops the operation of the detecting unit 33 with respect to the overall control unit 37 (Step S119). In contrast, if an entry is present in the CM related information management table 36a (Yes at Step S118), the display control unit 35 ends the operation of the mobile terminal device.

Figure 22:
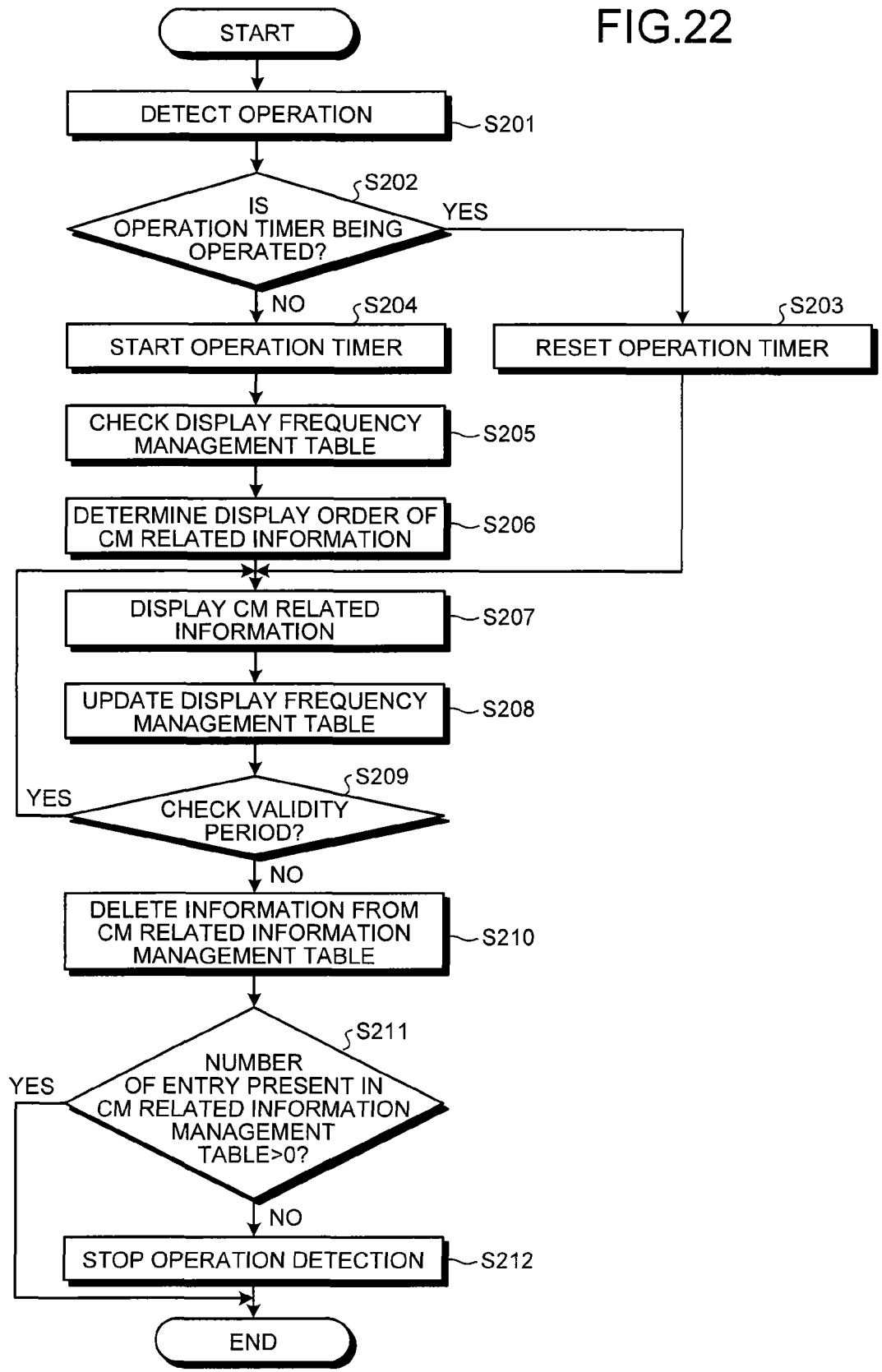
FIG. 22 is a flowchart illustrating a process performed when an operation with respect to the mobile terminal device according to the first embodiment is detected.

Process Performed when an Operation with Respect to the Mobile Terminal Device is Detected FIG. 22 is a flowchart illustrating a process performed when an operation with respect to the mobile terminal device according to the first embodiment is detected. In the mobile terminal device 30, the detecting unit 33 detects, while video content is being displayed on the display unit 24 in the receiving device 20, a first operation with respect to the mobile terminal device 30 and notifies the display control unit 35 via the overall control unit 37 that the operation has been detected (Step S201). Then, the display control unit 35 determines whether the operation timer is being operated (Step S202). The operation timer is a timer that measures the time at which the operation performed by the display control unit 35 with respect to the mobile terminal device 30 is detected or measures the time period for which the application is running on the mobile terminal device 30.

If the display control unit 35 determines that the operation timer is being operated (Yes at Step S202), the display control unit 35 moves the process to Step S203. If the display control unit 35 determines that the operation timer is not being operated (No at Step S202), the display control unit 35 moves the process to Step S204. At Step S203, the display control unit 35 resets the operation timer. When the display control unit 35 ends the process at Step S203, the display control unit 35 moves the process to Step S207.

In contrast, at Step S204, the display control unit 35 starts the operation timer. Then, the display control unit 35 checks the display frequency management table 36c (Step S205) and determines the display order of the CM related information on the basis of the check result (Step S206). Then, the display control unit 35 displays the CM related information on the display unit 34 in accordance with the display order determined at Step S206 or the display order stored in the CM related information management table 36a (Step S207).

Then, the display control unit 35 increments by one the display frequency obtained after the start of the displaying of the CM related information, which is displayed on the display unit 34 at Step S207; increments the display frequency during the operation detection by one; and updates the display frequency management table 36c (Step S208). Then, the display control unit 35 checks the validity period of the CM related information management table 36a (Step S209). Then, if CM related information that exceeds the validity period is present in the CM related information management table 36a (No at Step S209), the display control unit 35 deletes the CM related information from the CM related information management table 36a (Step S210). In contrast, if CM related information that exceeds the validity period is not present in the CM related information management table 36a (Yes at Step S209), the display control unit 35 moves the process to Step S207.

Subsequent to Step S210, the display control unit 35 determines whether an entry is present in the CM related information management table 36a (Step S211). If no entry is present in the CM related information management table 36a (No at Step S211), the display control unit 35 stops the operation of the detecting unit 33 with respect to the overall control unit 37 (Step S212). In contrast, if an entry is present in the CM related information management table 36a (Yes at Step S211), the display control unit 35 ends the process that is performed when the operation with respect to the mobile terminal device is detected.

Process Performed when the Detection with Respect to the Mobile Terminal Device Ends FIG. 23 is a flowchart illustrating a process performed when the detection with respect to the mobile terminal device according to the first embodiment ends. The display control unit 35 detects that the operation timer is timed out (Step S301). Specifically, the display control unit 35 determines that the operation with respect to the mobile terminal device 30 ends due to the time-out of the operation timer. Then, the display control unit 35 stops the operation timer (Step S302).

Then, the display control unit 35 records, in the display frequency management table 36c, the display frequency of each piece of the CM related information that has been displayed. The display frequency management table 36c records, for each CM ID, the display frequency after the start of the program viewing (after the start of the CM related information display) and the display frequency displayed during the time period for which the operation is detected. Then, the display control unit 35 checks the display frequency management table 36c (Step S303) and determines the display order of the CM related information on the basis of the check result (Step S304). Then, the display control unit 35 displays the CM related information on the display unit 34 in accordance with the display order determined at Step S304 or the display order stored in the CM related information management table 36a (Step S305).

Then, the display control unit 35 increments by one the display frequency obtained after the start of the displaying of the CM related information, which is displayed on the display unit 34 at Step S305; increments the display frequency during the operation detection by one; and updates the display frequency management table 36c (Step S306). Then, the display control unit 35 checks the validity period of the CM related information management table 36a (Step S307). Then, if CM related information that exceeds the validity period is present in the CM related information management table 36a (No at Step S307), the display control unit 35 deletes the CM related information from the CM related information management table 36a (Step S308). In contrast, if CM related information that exceeds the validity period is not present in the CM related information management table 36a (Yes Step S307), the display control unit 35 moves the process to Step S305.

Subsequent to Step S308, the display control unit 35 determines whether an entry is present in the CM related information management table 36a (Step S309). If no entry is present in the CM related information management table 36a (No at Step S309), the display control unit 35 stops the operation of the detecting unit 33 with respect to the overall control unit 37 (Step S310). In contrast, if an entry is present in the CM related information management table 36a (Step S309 Yes), the display control unit 35 ends the process that is performed when the operation with respect to the mobile terminal device is detected.

Display Order of the CM Related Information

Figure 24A:
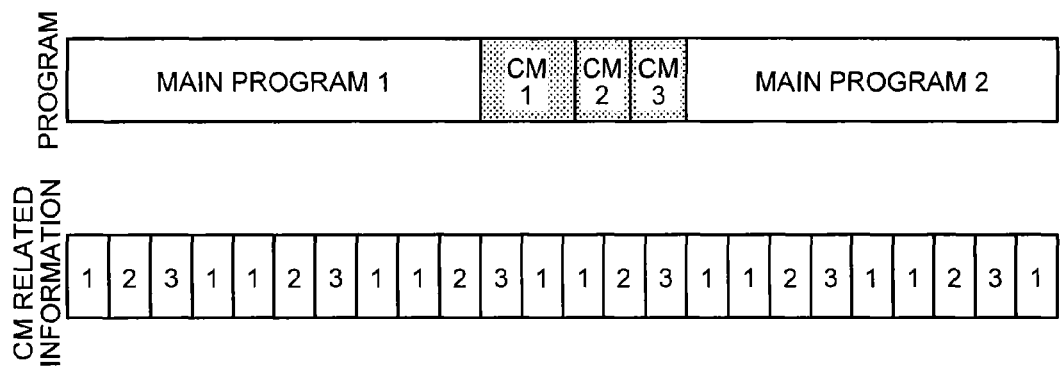
FIG. 24A is a schematic diagram illustrating an example of the display order of CM related information according to the first embodiment.

FIG. 24A is a schematic diagram illustrating an example of the display order of CM related information according to the first embodiment. FIG. 24A illustrates an example of displaying, on the display unit 34 in the mobile terminal device 30, the CM related information in accordance with the ratio of the broadcast lengths and the CM type. In FIG. 24A, as illustrated in FIG. 12, the ratio of the broadcast lengths expressed as CM1 to CM2 to CM3 is 2:1:1, the CM1 and the CM2 are both a "provided CM to a program" type, and the CM3 is a "spot CM" type. With this assumption, the programs are displayed on the display unit 24 in the receiving device 20 in the following order: main program 1, CM1, CM2, CM3, and main program 2. Furthermore, the CM related information is repeatedly displayed for the same length of time on the display unit 34 in the mobile terminal device 30 in the following order: CM1, CM2, CM3, and CM1. Consequently, even if a viewer looks at the display unit 34 in the mobile terminal device 30 during a CM in a program, the CM related information is still displayed; therefore, it is possible to prevent a drop in CM effectiveness due to CMs not being viewed.

Synchronization Display Between a CM and CM Related Information

Figure 24B:
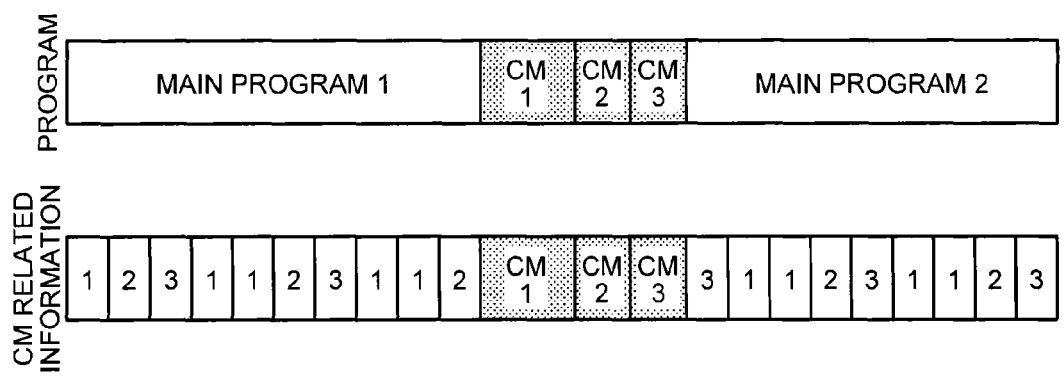
FIG. 24B is a schematic diagram illustrating an example of a display obtained by synchronizing a CM according to the first embodiment with CM related information.

FIG. 24B is a schematic diagram illustrating an example of a synchronization display between a CM according to the first embodiment and CM related information. In the example illustrated in FIG. 24B, basically, each CM is also displayed in a predetermined order on the display unit 34 in the mobile terminal device 30 during the same time period. However, as illustrated in FIG. 24B, when a CM is being displayed on the receiving device 20, the display control unit 35 in the mobile terminal device 30 may also display, on the display unit 34, the CM in synchronization with the CM related information on the basis of the CM insertion time stored in the CM related information management table 36a. Alternatively, the CM related information may also be displayed on the mobile terminal device 30 only during the time period for which the CM is being displayed on the receiving device 20. Consequently, even if a viewer looks at the display unit 34 in the mobile terminal device 30 when the CM is shown during the program, the CM related information is displayed; therefore, it is possible to prevent a drop in CM effectiveness due to CMs not being viewed.

Figure 24C:
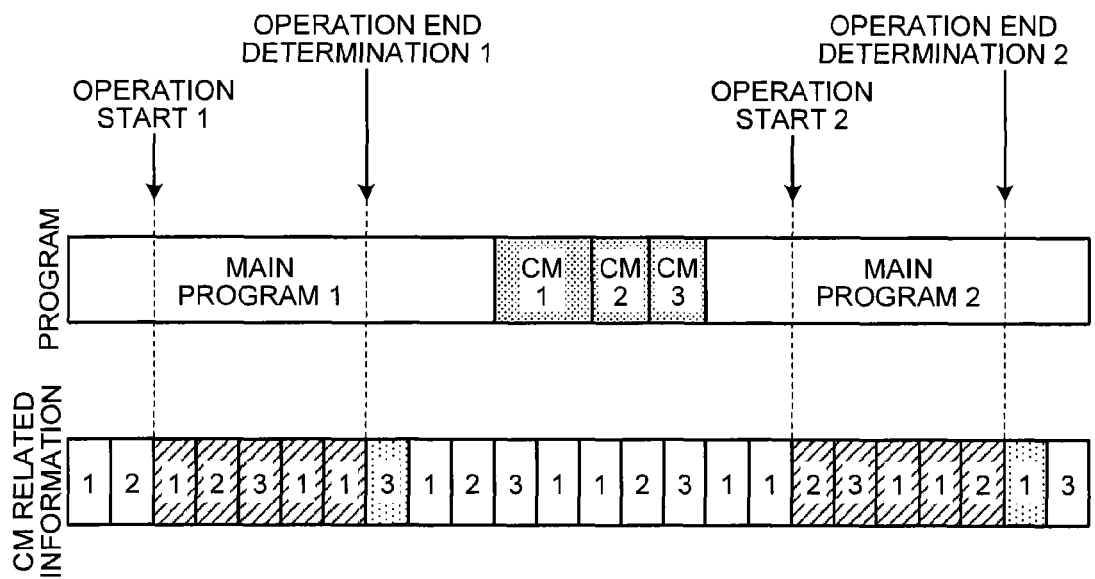
FIG. 24C is a schematic diagram illustrating an example of the display order of CM related information when an operation of the mobile terminal device according to the first embodiment is detected.

Display Order of the CM Related Information when an Operation of the Mobile Terminal Device is Detected FIG. 24C is a schematic diagram illustrating an example of the display order of CM related information when an operation of the mobile terminal device according to the first embodiment is detected. In the example illustrated in FIG. 24, each CM is also displayed on the display unit 34 in the mobile terminal device 30 during the same time period. As illustrated in FIG. 24C, if the detecting unit 33 in the mobile terminal device 30 detects an operation performed with respect to the mobile terminal device 30 at a midpoint of the main program 1 ("operation start 1" in FIG. 24C), the detecting unit 33 notifies the display control unit 35 via the overall control unit 37 of the operation detection. After the end of displaying the CM related information ("CM2" in FIG. 24C), which is currently being displayed, the display control unit 35 starts displaying the CM related information having the display order value of "1" in the CM related information management table 36a (the hatched portion on the main program 1 side of the "CM related information" in FIG. 24C).

At this time, the display control unit 35 starts the operation timer in order to measure, for example, 30 seconds. The operation timer is reset every time an operation detection notification is received from the detecting unit 33. If a time-out (for example, a 30-second measurement ends) occurs at the operation timer, the display control unit 35 determines that the operation ends ("operation end determination 1" in FIG. 24C) and records, in the display frequency management table 36c, the display frequency of the pieces of CM related information that have been displayed until that time.

The display control unit 35 specifies the CM related information that is displayed after the operation end determination on the basis of the display frequency management table 36c. In this example, the CM related information on the CM3 is displayed on the display unit 34 in the mobile terminal device 30 on the basis of the display frequency and the advertising ratio (the ratio of the CM insertion times to each other) after the start of the program viewing (the dotted portion on the main program 1 side in FIG. 24C).

The reason for displaying the CM related information of the CM3 on the mobile terminal device 30 immediately after the "operation end determination 1" illustrated in FIG. 24C is as follows. Namely, at the point of the "operation end determination 1" in FIG. 24C, the "display frequency after the start of the program viewing" recorded in the display frequency management table 36c is in the state illustrated in FIG. 20A. Furthermore, the broadcast length ratio is expressed as CM1 to CM2 to CM3 is 2:1:1. Because the CM related information is displayed on the basis of the broadcast length ratio, the broadcast length ratio is preferably equal, from the viewpoint of fairness, to the ratio of the "display frequency after the start of the program viewing". Accordingly, by displaying the CM related information on the CM3 on the mobile terminal device 30 immediately after the "operation end determination 1" illustrated in FIG. 24C, the broadcast length ratio becomes equal to the ratio of the "display frequency after the start of the program viewing".

Thereafter, the detecting unit 33 detects a second operation at a midpoint of the main program 2 ("operation start 2" in FIG. 24C). Then, the display control unit 35 determines the display order of the CM related information on the basis of the display frequency in the display frequency management table 36c during the operation time period and the advertising ratio. In this example, priority is given to the CM related information on the CM2 and the CM3 (the hatched portion on the main program 2 side in FIG. 24C). When a time-out occurs in the operation timer ("operation end determination 2" in FIG. 24C), the display control unit 35 updates the display frequency management table 36c and determines the CM related information that is to be displayed after the operation end is determined. In this example, the CM related information on the CM1 is displayed on the display unit 34 in the mobile terminal device 30 on the basis of the display frequency and the advertising ratio after the start of the program viewing (the dotted portion on the main program 2 side in FIG. 24C).

As described above, even when a viewer operates the mobile terminal device 30 while viewing a program, the CM related information is impartially displayed on the basis of the CM broadcast length, the advertising ratio of the unit price of the provided CM, and the like.

Figure 24D:
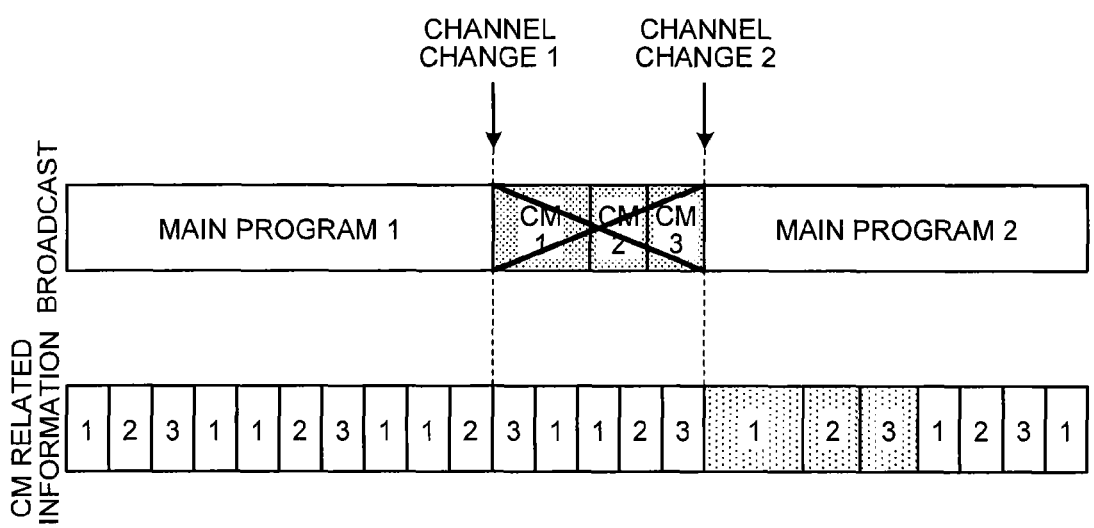
FIG. 24D is a schematic diagram illustrating an example of the display order of CM related information when a channel is changed while a CM is being broadcast according to the first embodiment.

Display Order of the CM Related Information when a Channel is Changed while a CM is being Broadcast FIG. 24D is a schematic diagram illustrating an example of the display order of CM related information when a channel is changed while a CM is being broadcast according to the first embodiment. In the example illustrated in FIG. 24D, basically, each CM is also displayed in a predetermined order on the display unit 34 in the mobile terminal device 30 during the same time period.

At this point, the display control unit 35 searches the CM related information management table 36a on the basis of the receive start time ("channel change 1" in FIG. 24D) of the storage location notification packet that is received due to a change in channels performed by the receiving device 20. Then, the display control unit 35 determines whether the target receive start time is included in the CM insertion time period. The CM insertion time period indicates an arbitrary time period (for example, 1 minute) that includes time before and after the CM insertion time (between 1 minute before the CM1 and 1 minute after the CM3 in FIG. 24C). If the display control unit 35 determines that the receive start time is included in the CM insertion time, the display control unit 35 records, in the CM skip management table 36b, the information related to the change in channels.

Thereafter, a channel is changed to the previous program again in the receiving device 20 ("channel change 2" in FIG. 24D). Then, the display control unit 35 in the mobile terminal device 30 determines whether the channel ID and the program ID sent as a notification from the receiving device 20 correspond to the previous channel ID and the previous program ID in the CM skip management table 36b.

If the channel ID and the program ID sent as a notification from the receiving device 20 correspond to the previous channel ID and the previous program ID in the CM skip management table 36b, the display control unit 35 performs the following process. Namely, the display control unit 35 determines whether the receive start time at this time and the receive start time (the "channel change 1" in FIG. 24D) recorded in the CM skip management table 36b are included in one of the CM insertion times in the CM related information management table 36a.

In this example, the receive start time at this time corresponds to the "channel change 2" in FIG. 24D. Furthermore, the receive start time recorded in the CM skip management table 36b corresponds to the "channel change 1" illustrated in FIG. 24D. In the example illustrated in FIG. 24D, because all of the CMs from CM1 to CM3 correspond to the "channel change 1", the display control unit 35 displays the CM related information on the display unit 34 in the same time period as, for example, the CM insertion time (the dotted portion of the CM related information in FIG. 24D).

As described above, when a viewer changes channels in the CM broadcast time period, even if a CM to be viewed is not viewed, a drop in CM effectiveness can be prevented by displaying the CM related information on the display unit 34 in the mobile terminal device 30.

Display of the CM Related Information

Figure 25A:
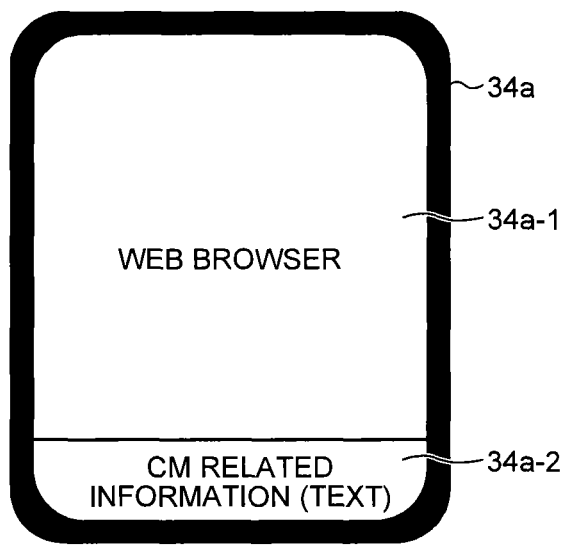
FIG. 25A is a schematic diagram illustrating an example of a display of CM related information according to the first embodiment.
Figure 25B:
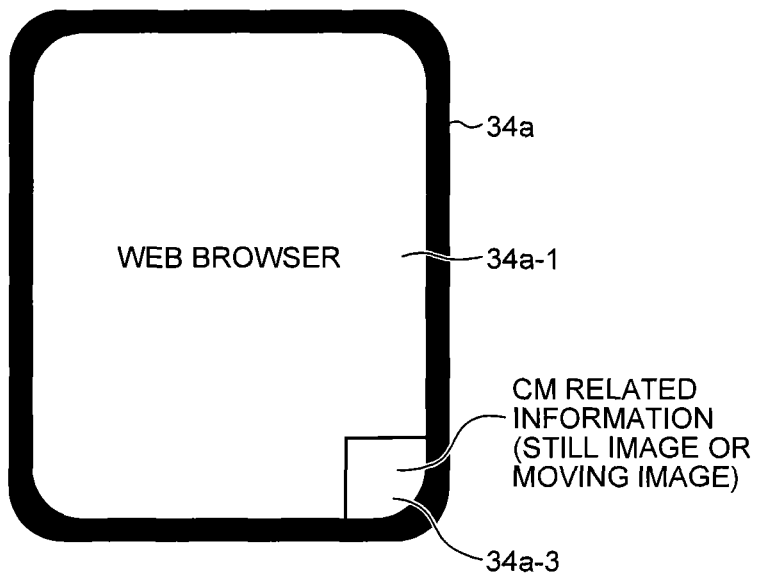
FIG. 25B is a schematic diagram illustrating an example of a display of the CM related information according to the first embodiment.
Figure 25C:
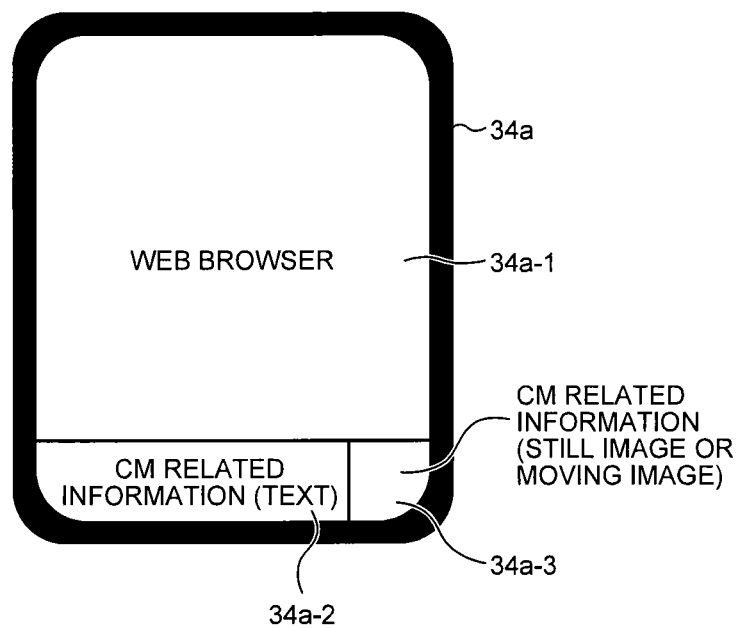
FIG. 25C is a schematic diagram illustrating an example of a display of the CM related information according to the first embodiment.

FIGS. 25A to 25C are schematic diagrams each illustrating an example of a display of CM related information according to the first embodiment. In the example illustrated in FIG. 25A, on a display screen 34a in the mobile terminal device 30, the CM related information is displayed using text in an area 34a-2 below a Web browser display 34a-1. In the example illustrated in FIG. 25B, on the display screen 34a in the mobile terminal device 30, the CM related information is displayed using a still image or a moving image in an area 34a-3 below the Web browser display 34a-1.

Furthermore, in the example illustrated in FIG. 25C, on the display screen 34a in the mobile terminal device 30, the CM related information is displayed using text, a still image, or a moving image in the area 34a-2 and the area 34a-3 below the Web browser display 34a-1. The example illustrated in FIGS. 25A to 25C are only examples of the display location of the CM related information. The CM related information may also be displayed on an upper portion of the display screen 34a, on a different screen to the display screen 34a, or a second screen with respect to a first screen included in the mobile terminal device 30 if the mobile terminal device 30 is, for example, a folding type.

As described above, the mobile terminal device receives CM-related-information stored information from the receiving device that has received, from the sending device, the CM-related-information stored information together with the main program and a program containing a CM. Then, the mobile terminal device receives CM related information that is related to the CM from the sending device on the basis of the CM-related-information stored information. Then, the mobile terminal device displays the CM related information using text, a still image, or a moving image on the display screen 34a in the area 34a-2 or 34a-3 below the Web browser display 34a-1, which is a normal display. Consequently, even if a viewer looks towards a screen of a mobile terminal device and away from the display screen of the receiving device while a CM is being broadcast, it is still possible for advertising to have the same effectiveness as that of CMs broadcast during a main program.

[b] Second Embodiment

In a second embodiment, a description will be given of a case in which the receiving device 20 receives the CM related information sent from the sending device 10 and then sends the CM related information to the mobile terminal device 30. In the second embodiment, descriptions of parts that are the same as those in the first embodiment will be omitted. In the receiving device 20 illustrated in FIG. 1, the receiving unit 21 receives both the video content and the CM-related-information stored information that are sent from the sending device 10. Then, the receiving unit 21 displays the video content on the display unit 24, detects CMDataServer_descriptor from the descriptor area of the PMT, and extracts the CM-related-information stored information, the channel ID, and the program ID. Then, the receiving unit 21 notifies the overall control unit 25 of the extracted CM-related-information stored information, the channel ID, and the program ID.

The overall control unit 25 sends, by using the communication unit 23, the CM related information acquisition request packet to the communication unit 14 in the sending device 10. The communication unit 14 in the sending device 10 that has received the CM related information acquisition request packet from the receiving device 20 sends, to the communication unit 23 in the receiving device 20, both the CM related information notification packet, which is associated with the channel ID and the program ID, and the CM related information data packet.

Figure 26:
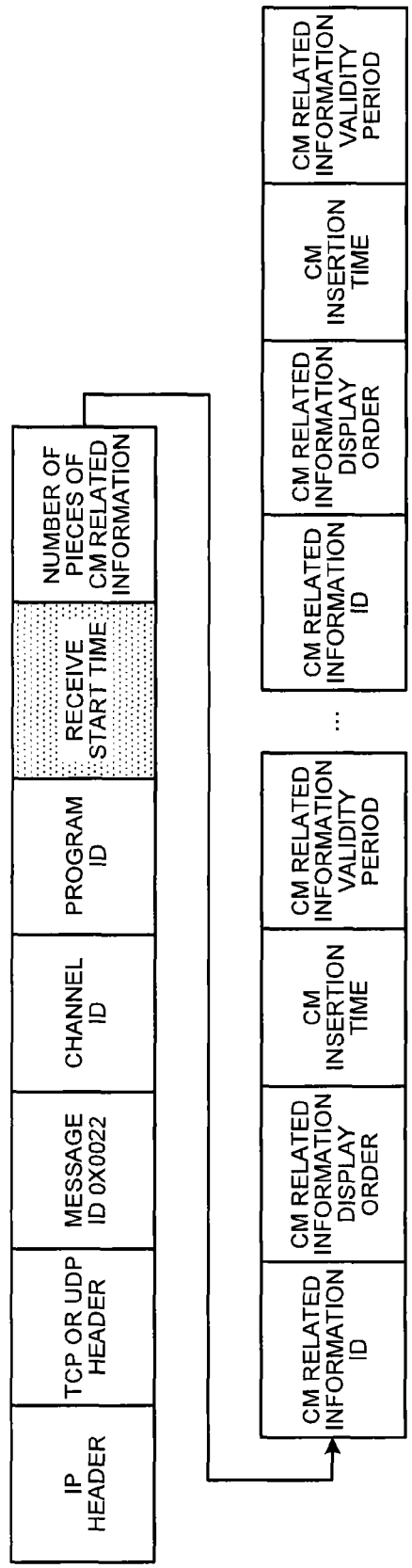
FIG. 26 is a schematic diagram illustrating the configuration of a CM related information notification packet according to a second embodiment.

Then, the receiving device 20 receives, by using the communication unit 23, the CM related information notification packet and the CM related information data packet. Then, the receiving device 20 sends, by using the communication unit 22, the CM related information notification packet and the CM related information data packet to the communication unit 31 in the mobile terminal device 30. FIG. 26 is a schematic diagram illustrating the configuration of a CM related information notification packet according to a second embodiment. As illustrated in FIG. 26, the "receive start time" indicated by the hatched portion is inserted in the CM related information notification packet according to the second embodiment. Other parts are the same as those described in the first embodiment.

ADVANTAGE OF THE EMBODIMENTS

According to the first and second embodiments described above, it is possible to prevent a state in which a CM, due to an operation of the mobile terminal device, is not viewed by a viewer. Furthermore, CM related information is impartially displayed to the viewer, thus preventing the purpose of the CMs, i.e., advertising effectiveness from being reduced.

Hardware Configuration

Each unit that executes the processes described in the above embodiments can be implemented by an integrated circuit, such as an ASIC, a CPU, an MPU, an FPGA, or the like. Each unit that executes the processes can be executed by cooperating with the integrated circuit, such as the CPU, an internal storage device, and external storage. Furthermore, each unit that stores, retains, or accumulates the information described in the above embodiments can be implemented by, for example, a RAM, a flash memory, and external storage.

The ASIC is an "Application Specific Integrated Circuit", the CPU is a "central processing unit", the MPU is a "micro processing unit", and the FPGA is a "field programmable gate array". The internal storage device is a semiconductor memory device, such as a random access memory (RAM). The external storage is a storage device using a storage medium, such as a flash memory, a magnetic disk, an optical disk, a magneto-optic disk, or the like.

Processing Program

Figure 27A:
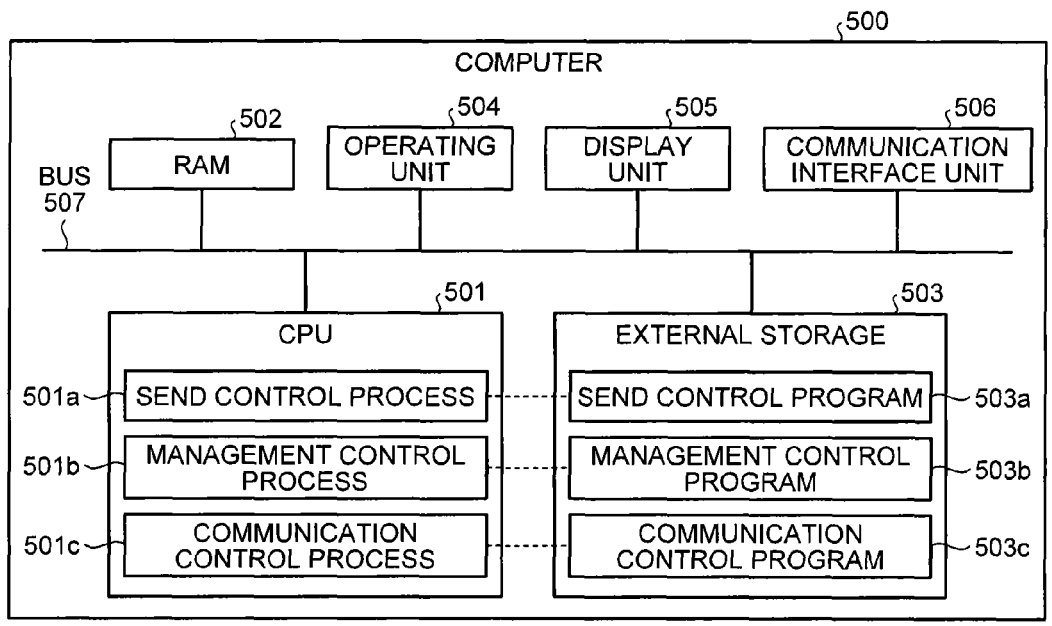
FIG. 27A is a block diagram illustrating a computer, functioning as a sending device, that executes a data sending and receiving program according to the first embodiment and the second embodiment.

The various processes performed by the sending device 10, the receiving device 20, and the mobile terminal device 30 described in the first and second embodiments may also be performed by a computer executing a program prepared in advance. FIG. 27A is a block diagram illustrating a computer, functioning as a sending device, that executes a data sending and receiving program according to the first embodiment and the second embodiment. As illustrated in FIG. 27A, a computer 500 includes a CPU 501, a RAM 502, an external storage 503, an operating unit 504 that receives an operation performed by a user, a display unit 505 that displays information related to various processes, and a communication interface unit 506, which are all connected via a bus 507.

The external storage 503 previously stores therein various data needed to execute a send control program 503a, a management control program 503b, and a communication control program 503c, each having the same function as that performed by the sending unit 11, the managing unit 13, and the communication unit 14, respectively, illustrated in FIG. 1. A data sending and receiving program executed by the sending device 10 may also be integrated or separated in a similar manner as that illustrated in FIG. 1.

As illustrated in FIG. 27A, the CPU 501 reads the programs 503a to 503c from the external storage 503 and executes them. Consequently, the send control program 503a functions as a send control process 501a. Furthermore, the management control program 503b functions as a management control process 501b. Furthermore, the communication control program 503c functions as a communication control process 501c.

Figure 27B:
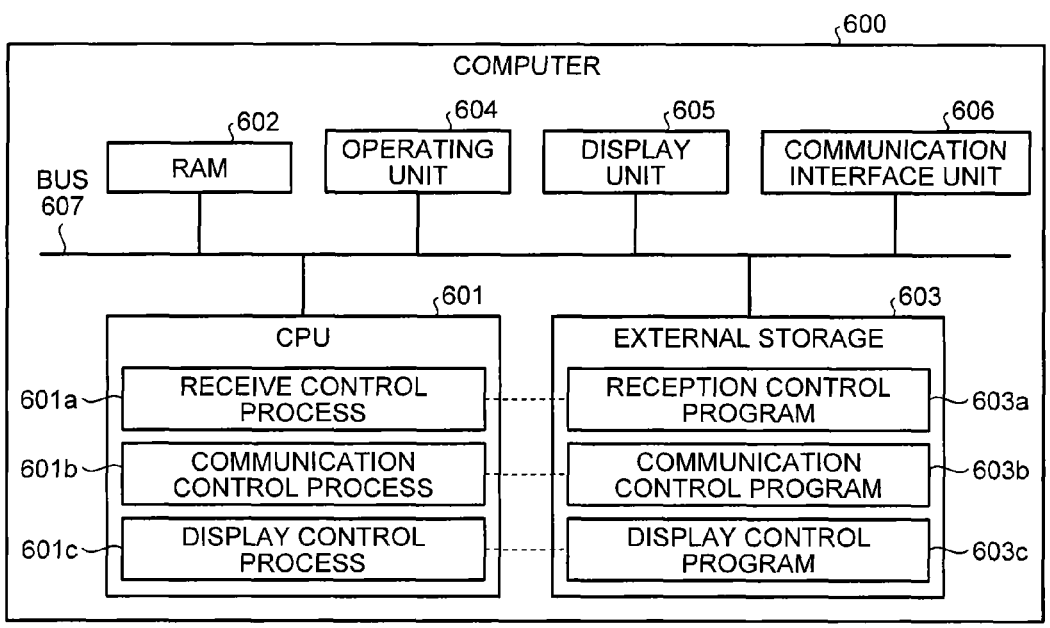
FIG. 27B is a block diagram illustrating a computer, functioning as a receiving device, that executes a data sending and receiving program according to the first embodiment and the second embodiment.

FIG. 27B is a block diagram illustrating a computer, functioning as a receiving device, that executes a data sending and receiving program according to the first embodiment and the second embodiment. As illustrated in FIG. 27B, a computer 600 includes a CPU 601, a RAM 602, an external storage 603, an operating unit 604 that receives an operation performed by a user, a display unit 605 that displays information related to various processes, and a communication interface unit 606, which are all connected via a bus 607.

The external storage 603 previously stores therein various data needed to execute a reception control program 603a, a communication control program 603b, and a display control program 603c, each having the same function as that performed by the receiving unit 21, the communication unit 22, the communication unit 23, and the display unit 24, respectively, illustrated in FIG. 1. A data sending and receiving program executed by the receiving device 20 may also be integrated or separated in a similar manner as that illustrated in FIG. 1.

As illustrated in FIG. 27B, the CPU 601 reads the programs 603a to 603c from the external storage 603 and executes them. Consequently, the reception control program 603a functions as a receive control process 601a. Furthermore, the communication control program 603b functions as a communication control process 601b. Furthermore, the display control program 603c functions as a display control process 601c.

Figure 27C:
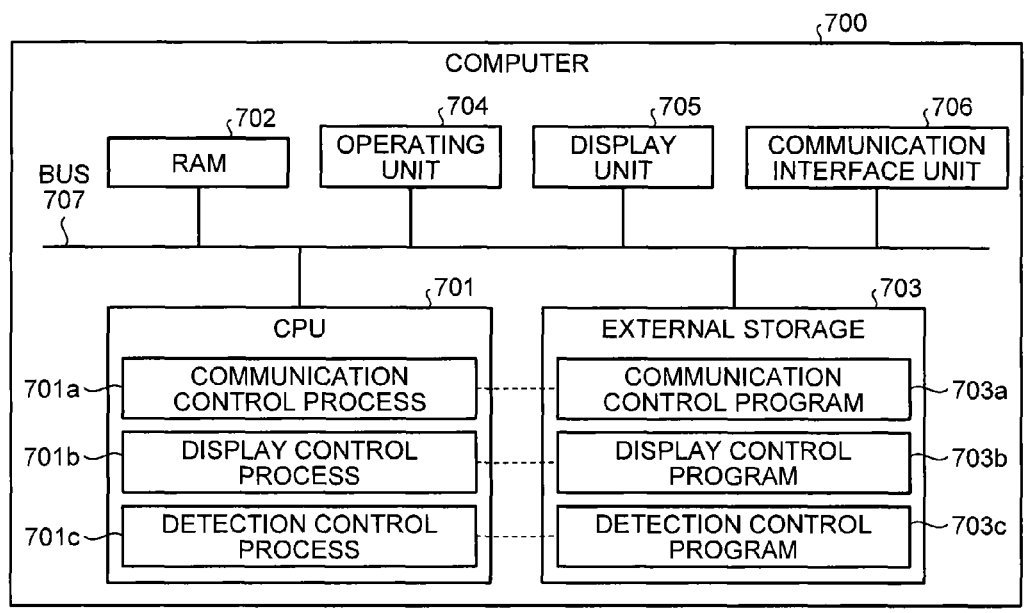
FIG. 27C is a block diagram illustrating a computer, functioning as a mobile terminal device, that executes a data sending and receiving program according to the first embodiment and the second embodiment.

FIG. 27C is a block diagram illustrating a computer, functioning as a mobile terminal device, that executes a data sending and receiving program according to the first embodiment and the second embodiment. As illustrated in FIG. 27C, a computer 700 includes a CPU 701, a RAM 702, an external storage 703, an operating unit 704 that receives an operation performed by a user, a display unit 705 that displays information related to various processes, and a communication interface unit 706, which are all connected via a bus 707.

The external storage 703 previously stores therein various data needed to execute a communication control program 703a, a display control program 703b, and a detection control program 703c, each having the same function as that performed by the communication unit 31, the communication unit 32, the display control unit 35, and the detecting unit 33, respectively, illustrated in FIG. 1. A data sending and receiving program executed by the mobile terminal device 30 may also be integrated or separated in a similar manner as that illustrated in FIG. 1.

As illustrated in FIG. 27C, the CPU 701 reads the programs 703a to 703c from the external storage 703 and executes them. Consequently, the communication control program 703a functions as a communication control process 701a. Furthermore, the display control program 703b functions as a display control process 701b. Furthermore, the detection control program 703c functions as a detection control process 701c.

The units illustrated in FIG. 1, which are implemented by the programs 503a to 703c in the CPUs 501, 601, and 701, the RAMS 502, 602 and 702, and the external storages 503, 603, and 703, may appropriately be implemented when a process is executed. Furthermore, the programs 503a, 603a, and 703c are not previously stored in the external storage 503, 603, and 703, respectively. For example, each of the programs 503a, 603a, and 703c is previously stored in a portable physical medium, such as a portable magnetic disk, an optical disk, a magneto-optic disk, or a card mounted on an integrated circuit, from which the computers 500, 600, and 700 can read the programs 503a, 603a and 703c, respectively. Then, the computers 500, 600, and 700 read the programs 503a to 503c, 603a to 603c, and 703a to 703c, respectively, from the portable physical medium via a media reader and executes the programs 503a to 503c, 603a to 603c, and 703a to 703c. Furthermore, each program may be stored in another computer that is connected to the computers 500, 600, and 700 via the communication interface units 506, 606, and 706 through a public network or a local private network and then the computers 500, 600, and 700 may obtain the programs 503a, 503b, and 703c, respectively, from the other computer and execute the programs.

According to an aspect of the embodiment, an advantage is provided in that it is possible to reduce a drop in the advertising effectiveness of CMs broadcast during a main program.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data output method performed in a data sending and receiving system that includes a receiving device and a terminal device that receive data from a sending device, the data output method comprising:
    first receiving, by the receiving device, from the sending device, first data and second data including information of a storage location of information related to specific data contained in the first data or the information related to the specific data on the basis of the received second data, and third data including a time period during which the specific data is inserted in the first data;
    first outputting, by the receiving device, the first data to a first output unit;
    second receiving, by the terminal device, the second data or the information related to the specific data and the third data from the receiving device; and
    second outputting, by the terminal device to a second output unit, the information related to the specific data received from the receiving device, making a time length during which the information related to the specific data is output to the second output unit become the same as a time length during which the specific data is output to the first output unit on the basis of the third data.

2. The data output method according to claim 1, wherein the second receiving includes receiving, by the terminal device, the information related to the specific data from the sending device on the basis of the second data.

3. The data output method according to claim 1, wherein the second outputting includes outputting, by the terminal device, information related to multiple pieces of the specific data to the second output unit in a predetermined order during an output time period for which the first data is output to the first output unit.

4. The data output method according to claim 1, further comprising:
    detecting, by the terminal device, an operation with respect to the terminal device or an application program that is executed in the terminal device, wherein
    the second outputting includes outputting, by the terminal device to the second output unit when the detection of the operation or the execution is started, information related to multiple pieces of the specific data from the top in a predetermined order.

5. The data output method according to claim 4, further comprising:
    storing, by the terminal device, for each piece of the information related to the multiple pieces of the specific data, a first frequency, at which the information related to the multiple pieces of the specific data is output to the second output unit during an output time period, and a second frequency, at which the information related to the multiple pieces of the specific data is output to the second output unit during a detection time period for which the operation or the execution is detected, and which is within the first frequency, wherein the second outputting includes outputting, by the terminal device to the second output unit when the detection of the operation or the execution ends, the information related to the multiple pieces of the specific data in an order that depends on the first frequency and the second frequency.

6. The data output method according to claim 1, wherein the second outputting includes outputting, by the terminal device, the information related to the specific data, which is to be output to the second output unit during a time period from when fourth data that is different from the second data is received until the second data is acquired, to the second output unit in a predetermined order immediately after the time period.

7. The data output method according to claim 1, further comprising:

displaying, by the receiving device and the terminal device, on the first output unit and the second output unit, in synchronization, the specific data and the information related to the specific data, respectively.

8. A computer readable storage medium having stored therein a data output program for executing a data output process, the data output program causing a computer as a terminal device to execute a process comprising:

receiving second data or information related to specific data, and third data from a receiving device that receives, from a sending device, first data, the second data including information of a storage location of the information related to the specific data contained in the first data or the information related to the specific data on the basis of the second data received thereby, and the third data including a time period during which the specific data is inserted in the first data; and outputting, to an output unit of the computer the information related to the specific data received from the receiving device, making a time length during which the information related to the specific data is output to the output unit become the same as a time length during which the specific data is output to an output unit of the receiving device on the basis of the third data.

9. The computer readable storage medium according to claim 8, wherein the process further comprises detecting an operation with respect to the computer or an application program that is executed in the computer, wherein the outputting includes outputting, when the detection of the operation or the execution is started, information related to multiple pieces of the specific data from the top in a predetermined order.

10. The computer readable storage medium to claim 9, wherein the process further comprises storing, in a storing unit for each piece of the information related to the multiple pieces of the specific data, a first frequency, at which the information related to the multiple pieces of the specific data is output in the output unit during an output time period for which the first data is output in the receiving device, and a second frequency, at which the information related to the multiple pieces of the specific data is output in the output unit during a detection time period for which the operation or the execution is detected, and which is within the first frequency, wherein the outputting includes outputting, to the output unit when the detection of the operation or the execution ends, the information related to the multiple pieces of the specific data in an order that depends on the first frequency and the second frequency.

11. The computer readable storage medium according to claim 8, wherein the receiving includes receiving the information related to the specific data from the sending device on the basis of the second data received from the receiving device.

12. A terminal device comprising:

a processor; and a memory, wherein the processor executes a process comprising:

receiving second data or information related to specific data, and third data from a receiving device that receives, from a sending device, first data, the second data including information of a storage location of the information related to the specific data contained in the first data or the information related to the specific data on the basis of the second data received thereby, and the third data including a time period during which the specific data is inserted in the first data; and outputting, to an output unit of the terminal device the information related to the specific data received from the receiving device, making a time length during which the information related to the specific data is output to the output unit become the same as a time length during which the specific data is output to an output unit of the receiving device on the basis of the third data.

13. The terminal device according to claim 12, wherein the process further comprises detecting an operation with respect to the terminal device or an application program executed in the terminal device, wherein when the detection of the operation or the execution is started, outputting information related to multiple pieces of the specific data from the top in a predetermined order.

14. The terminal device according to claim 13, further comprising a storing unit that stores therein, for each piece of information related to the multiple pieces of the specific data, a first frequency, at which the information related to the multiple pieces of the specific data is output to the output unit during an output time period for which the first data is output to an output unit in the receiving device, and a second frequency, at which the information related to the multiple pieces of the specific data is output to the output unit during a detection time period for which the operation or the execution is detected, and which is within the first frequency, wherein the process further comprises outputting, when the detection of the operation or the execution ends, the information related to the multiple pieces of the specific data in an order that depends on the first frequency and the second frequency.

15. The terminal device according to claim 12, wherein the receiving includes receiving the information related to the specific data from the sending device on the basis of the second data received from the receiving device.

* * * * *